(12) United States Patent
Howe et al.

(10) Patent No.: US 12,031,089 B2
(45) Date of Patent: Jul. 9, 2024

(54) CERAMIC FOUNDRY MEDIA AND RELATED METHODS

(71) Applicant: CARBO CERAMICS INC., Houston, TX (US)

(72) Inventors: Steven C. Howe, Richmond, TX (US); Chad Cannan, Lancaster, NY (US); Todd Roper, Katy, TX (US)

(73) Assignee: CARBO CERAMICS INC., Houston, TX (US)

( * ) Notice: Subject to any disclaimer, the term of this patent is extended or adjusted under 35 U.S.C. 154(b) by 0 days.

(21) Appl. No.: 17/329,292

(22) Filed: May 25, 2021

(65) Prior Publication Data

US 2021/0284900 A1 Sep. 16, 2021

Related U.S. Application Data

(63) Continuation of application No. 16/005,006, filed on Jun. 11, 2018, now Pat. No. 11,015,112, which is a
(Continued)

(51) Int. Cl.
*C09K 8/80* (2006.01)
*C09K 8/524* (2006.01)
*C09K 8/528* (2006.01)

(52) U.S. Cl.
CPC .............. *C09K 8/80* (2013.01); *C09K 8/524* (2013.01); *C09K 8/528* (2013.01);
(Continued)

(58) Field of Classification Search
CPC ....... C04B 38/009; C04B 30/02; C04B 38/08; C04B 26/06; C04B 26/04; C04B 26/02;
(Continued)

(56) References Cited

U.S. PATENT DOCUMENTS 4,392,987 A * 7/1983 Laine ................. B01J 35/08
423/628
6,372,678 B1 4/2002 Youngman et al.
(Continued)

FOREIGN PATENT DOCUMENTS

CN 1393424 A 1/2003
CN 1753846 A 3/2006
(Continued)

OTHER PUBLICATIONS

"D. V. Satya Gupta et al., ""A chemical inhibitor-infused, high-strength proppant additive for reservoir ftow assurance against scale deposition in wells with high intervention costs""", Society of Petroleum Engineers, vol. SPE 165078, Jun. 7, 2013, pp. 1-11.".
(Continued)

*Primary Examiner* — Alexander M Weddle
(74) *Attorney, Agent, or Firm* — Patterson + Sheridan, LLP

(57) ABSTRACT

Ceramic foundry media is provided. The ceramic foundry media have a size of about 80 mesh to about 10 mesh, an average largest pore size of less than about 20 microns, and a surface roughness of less than about 4 microns. The ceramic foundry media are formed by drip casting. A slurry of finely divided particles is flowed through nozzles and formed into droplets under the influence of vibration. Uniform sized, smooth surface, spherical green particles are formed. The green particles are dried and sintered to form the foundry media.

20 Claims, 6 Drawing Sheets

Related U.S. Application Data continuation of application No. 14/813,452, filed on Jul. 30, 2015, now Pat. No. 9,994,764.

(60) Provisional application No. 62/031,564, filed on Jul. 31, 2014.

(52) U.S. Cl.
CPC ...... *C09K 2208/10* (2013.01); *C09K 2208/12* (2013.01); *C09K 2208/20* (2013.01); *C09K 2208/22* (2013.01); *C09K 2208/32* (2013.01)

(58) Field of Classification Search
CPC ..... C04B 28/26; C04B 26/24; C04B 20/1033; C04B 20/1037; C04B 20/104; C04B 20/1048; C04B 28/24; C04B 14/24; C04B 2111/28; C04B 2201/30; C04B 38/0038; C03C 17/001; C03C 17/25; C03C 2218/111; F16L 59/028; F16L 59/029; Y02W 30/91; F25D 23/06; F25D 2201/14; F25D 2201/122; F25D 23/062; Y02B 40/00

See application file for complete search history.

(56) References Cited

U.S. PATENT DOCUMENTS

| | | | |
|---|---|---|---|
| 9,994,764 B2 | 6/2018 | Howe et al. | |
| 11,015,112 B2 | 5/2021 | Howe et al. | |
| 2003/0173087 A1 | 9/2003 | Kirk | |
| 2004/0040708 A1 | 3/2004 | Stephenson et al. | |
| 2004/0060702 A1* | 4/2004 | Kotlar ................ | C09K 8/92 166/310 |
| 2008/0135245 A1* | 6/2008 | Smith ................ | C04B 35/56 166/280.1 |
| 2009/0008093 A1 | 1/2009 | Duenckel | |
| 2009/0038797 A1 | 2/2009 | Skala et al. | |
| 2009/0139719 A1 | 6/2009 | Luo et al. | |
| 2009/0178807 A1 | 7/2009 | Kaufman et al. | |
| 2012/0097392 A1 | 4/2012 | Reyes et al. | |
| 2012/0227968 A1* | 9/2012 | Eldred ................ | C09K 8/805 507/140 |
| 2012/0231981 A1* | 9/2012 | Eldred ................ | C04B 33/04 507/211 |
| 2012/0241157 A1* | 9/2012 | Pope ................ | E21B 43/267 166/308.1 |
| 2012/0273197 A1 | 11/2012 | Gupta | |
| 2013/0025862 A1* | 1/2013 | Eldred ................ | C09K 8/80 264/9 |
| 2013/0213657 A1 | 8/2013 | Dobson, Jr. et al. | |
| 2014/0000891 A1 | 1/2014 | Mahoney et al. | |
| 2014/0038860 A1* | 2/2014 | Skala ................ | C04B 35/26 507/269 |

FOREIGN PATENT DOCUMENTS

| | | | | |
|---|---|---|---|---|
| CN | 101522856 A | | 9/2009 | |
| GB | 2298440 A | * | 9/1996 | ............... C09K 8/80 |
| GB | 2298440 A | | 9/1996 | |
| WO | 2008018966 A2 | | 2/2008 | |
| WO | 2013158308 A1 | | 10/2013 | |

OTHER PUBLICATIONS

European Search Report dated Jan. 8, 2018 for Application No. 15827352.4.
International Preliminary Report on Patentability PCT/US2015/042819 (34955.451WO) dated Feb. 9, 2017.
"International Search Report and Written Opinion received in Patent Cooperation Treaty No. PCT/US2015/042819, dated Oct. 30, 2015, 17 pages.".
"Cinco-Ley, H. et al., Transient Pressure Behavior for a Well with a Finite-Conductivity Vertical Fracture, 1978, SPE J. 18 (4): 253-264, SPE-6014-PA.".
Office Action for U.S. Appl. No. 14/813,452 dated Dec. 22, 2016.
Final Office Action for U.S. Appl. No. 14/813,452 dated Sep. 7, 2017.
Office Action for Chinese Application No. 201580047514.5 dated Oct. 18, 2018.
Office Action for Eurasian Application No. 201790269 dated Aug. 29, 2018.
Australia Office Action dated Jun. 19, 2019 for Application No. 2015296528.
Indian Office Action dated Nov. 4, 2019 for Application No. 201717005231.
Chinese Office Action dated Jan. 19, 2020 for Application No. 201580047514.5.
Brazilian Office Action dated Jul. 7, 2020 for Application No. BR112017001959-0.
EPO Examination Report dated May 27, 2020 for Application No. 15827352.4.
D. V. Satya Gupta et al., "A chemical inhibitor-inused, high-strength proppant additive for reservoir flow assurance against scale deposition in wells with high intervention costs", Society of Petroleum Engineers, vol. SPE 165078, Jun. 7, 2013, pp. 1-11.
European Search Report dated Jan. 8, 2019 for Application No. 15827352.4.
Chinese Office Action dated Jun. 29, 2022 for Application No. 202010710326.9.
Chinese Office Action dated Feb. 5, 2023 for Application No. 202010710326.9.

* cited by examiner

CERAMIC FOUNDRY MEDIA AND RELATED METHODS

CROSS-REFERENCE TO RELATED APPLICATION

The present application is a continuation application that claims priority to U.S. patent application Ser. No. 16/005,006, filed Jun. 11, 2018, which claims priority to, and the benefit of the filing date of, U.S. patent application Ser. No. 14/813,452, filed Jul. 30, 2015, which claims priority to, and the benefit of the filing date of, U.S. Patent Application No. 62/031,564, filed Jul. 31, 2014. Each of the above-referenced patent applications is hereby incorporated herein by reference in its entirety.

FIELD OF THE INVENTION

The present invention relates to ceramic foundry media and related methods.

BACKGROUND

Oil and natural gas are produced from wells having porous and permeable subterranean formations. The porosity of the formation permits the formation to store oil and gas, and the permeability of the formation permits the oil or gas fluid to move through the formation. Permeability of the formation is essential to permit oil and gas to flow to a location where it can be pumped from the well. Sometimes the oil or gas is held in a formation having insufficient permeability for economic recovery of the oil and gas. In other cases, during operation of the well, the permeability of the formation drops to the extent that further recovery becomes uneconomical. In such cases, it is necessary to fracture the formation and prop the fracture in an open condition by means of a proppant material or propping agent. Such fracturing is usually accomplished by hydraulic pressure, and the proppant material or propping agent is a particulate material, such as sand, glass beads or ceramic particles, which are carried into the fracture by means of a fluid.

In the course of production, oil and gas wells can oftentimes exhibit scale formation and/or paraffin deposition that can reduce well production. Many types of chemical treatment agents have been used to prevent scale formation and/or paraffin deposition. One technique for delivering such chemical treatment agents downhole includes infusing porous ceramic proppant particulates with the chemical treat agent. In many instances, the chemical treatment agent must first be dissolved in an aqueous, organic or inorganic solvent to enable the infusion of the chemical treatment agent into the porous ceramic proppant particulates. If the chemical treatment agent is too viscous, however, this can result in lower effective amounts of the chemical treatment agent being present in the infused proppant than desired or uneven or ineffective infusion altogether. Dissolving the chemical treatment agent in the solvent is also an additional step that can be costly and time consuming.

There is a need therefore to infuse a chemical treatment agent directly into porous ceramic proppant without the need for a solvent. There is also a need to evenly distribute a chemical treatment agent throughout porous ceramic proppant.

DETAILED DESCRIPTION

Figure 1:
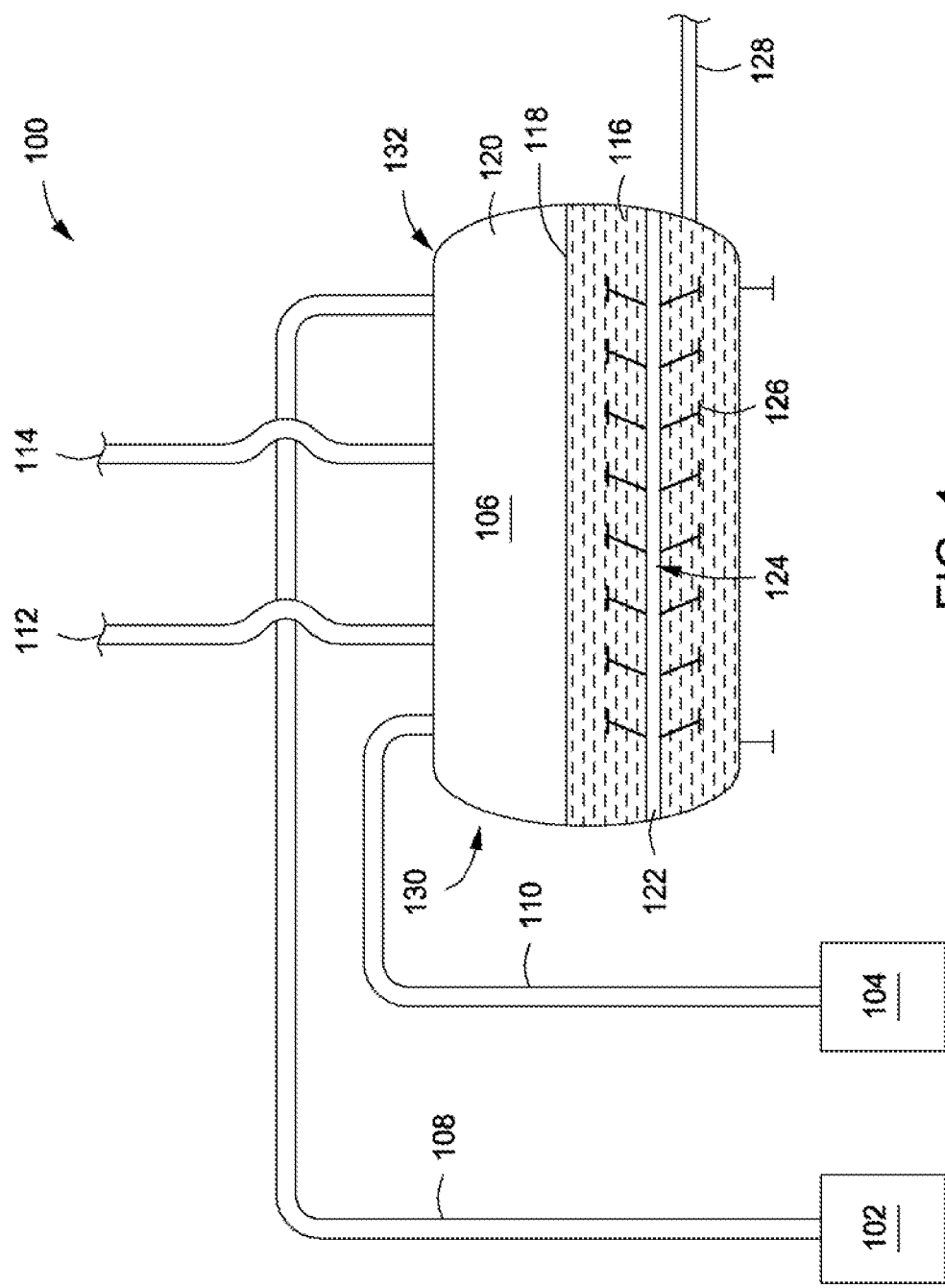
FIG. 1 is a schematic illustration of a system for infusing porous ceramic proppant with a chemical treatment agent, according to several exemplary embodiments of the present invention.

In the following description, numerous specific details are set forth. However, it is understood that embodiments of the invention may be practiced without these specific details. In other instances, well-known structures and techniques have not been shown in detail in order not to obscure the understanding of this description.

The term "apparent specific gravity," as used herein, is the weight per unit volume (grams per cubic centimeter) of the particles, including the internal porosity. The apparent specific gravity values given herein were determined by the Archimedes method of liquid (water) displacement according to API RP60, a method which is well known to those of ordinary skill in the art. For purposes of this disclosure, methods of testing the characteristics of the proppant in terms of apparent specific gravity are the standard API tests that are routinely performed on proppant samples.

The term "conductivity," as used herein, is defined as the product of the width of the created fracture and the permeability of the proppant that remains in the fracture.

The term "substantially round and spherical" and related forms, as used herein, is defined to mean an average ratio of minimum diameter to maximum diameter of about 0.8 or greater, or having an average sphericity value of about 0.8 or greater compared to a Krumbein and Sloss chart.

The term "high density proppant," as used herein, means a proppant having an apparent specific gravity of greater than 3.4 g/cm$^3$.

The term "intermediate density proppant," as used herein, means a proppant having an apparent specific gravity of from about 3.1 to 3.4 g/cm$^3$.

The term "light weight proppant," as used herein, means a proppant having an apparent specific gravity of less than 3.0 g/cm$^3$.

The term "internal interconnected porosity," as used herein, is defined as a percentage of the pore volume, or void volume space, over the total volume of a porous ceramic particulate.

The term "chemical treatment agent," as used herein, is defined as an element, compound, or composition that can inhibit deleterious properties which downhole fluids might otherwise exhibit and/or provide some function that is useful for the production performance of a hydraulically fractured well.

The term "degradable," as used herein, means the ability of a chemical or coating to react to dissolve or breakdown into smaller components under one or more downhole conditions.

According to certain embodiments of the present invention, a composite ceramic proppant composition for use in hydraulic fracturing is produced. According to certain embodiments of the present invention, the composite ceramic proppant comprises a non-porous particulate part and a porous ceramic particulate part, wherein the porous ceramic particulate is infused with a chemical treatment agent. Furthermore, according to certain embodiments of the present invention, the permeability and conductivity of the composite ceramic proppant composition is at least equal to the permeability and conductivity of the non-porous particulate part alone. The porous ceramic particulates, or porous ceramic proppants, can have any internal porosity, or percent (%) porosity. The internal porosity of the porous ceramic proppant can be infused with a chemical treatment agent so that the porous ceramic proppant acts as a carrier for the chemical treatment agent in a hydraulic fracturing operation.

Disclosed herein are systems and methods for infusing, impregnation, injecting, or otherwise introducing a chemical treatment agent into interstitial or porous spaces of porous ceramic particulates. In one or more exemplary embodiments, the systems and methods can include microwave blending, vacuum infusion, thermal infusion, capillary action, ribbon blending at room or elevated temperature, or pug mill processing, or any combination thereof. In particular, systems and methods are disclosed herein for using microwave energy to infuse chemical treatment agents into porous ceramic proppants used in the hydraulic fracture stimulation of gas, oil, or geothermal reservoirs. Also described herein are the infused porous ceramic particulates and systems and methods for preparing such from a slurry of an alumina containing raw material for use as proppants. It has been found that infusing one or more chemical treatment agents into one or more porous ceramic particulates in the presence of microwave energy can result in homogeneous placement of the chemical treatment agent into the porous ceramic particulates such that the chemical treatment agents are uniformly distributed or substantially uniformly distributed throughout the particles.

FIG. 1 is a schematic illustration of a system 100 for infusing porous ceramic particulates with a chemical treatment agent, according to several exemplary embodiments. The system 100 can include one or more first microwave generators 102, one or more second microwave generators 104, and one or more mixing vessels 106. The first and second microwave generators 102, 104 can include any number of microwave generators. For example, the first microwave generator 102 can include 1, 2, 3, 4, 5, or 6 or more microwave generators. The second microwave generator 104 can also include 1, 2, 3, 4, 5, or 6 or more microwave generators.

The mixing vessel 106 can include one or more agitators 122 disposed therein. The agitator 122 can be arranged in any manner within the vessel 106. For example, the agitator 122 can be arranged substantially parallel to a longitudinal centerline of the vessel 106. As shown in FIG. 1, the agitator 122 is substantially parallel to and axially offset from the longitudinal centerline of the vessel 106. The agitator can include a shaft 124 and one or more agitator blades 126 connected or otherwise attached thereto. The agitator blades 126 can be linearly arranged, arranged in spiral fashion, and/or in an alternating fashion along the length of the shaft 124.

The first microwave generator 102 can be adapted to provide microwave energy to the mixing vessel 106 via one or more first wave guides 108. The second microwave generator 104 can be adapted to provide microwave energy to the mixing vessel 106 via one or more second wave guides 110. The first and second waveguides 108, 110 can be or include any conduit, tubular, or other structure that can be sufficient for or capable of guiding microwaves generated from the first and second generators, 102, 104 to the vessel 106. The first and second generators 102, 104 can also be in fluid communication with one or more mixing tanks 106 via the first and second waveguides 108, 110. The first and second waveguides 108, 110 can be coupled to the vessel 106 at any suitable location(s). The first waveguide 108 can be coupled to vessel 106 at a location proximate a first end 130 of the vessel 106. The second waveguide 110 can be coupled to the vessel 106 at a location proximate a second end 132 of the vessel 106.

One or more ceramic feed lines 112 and one or more chemical treatment agent feed lines 114 can be coupled to or in fluid communication with the vessel 106. The ceramic feed line 112 and the chemical treatment agent feed line 114 can be coupled to vessel 106 at any suitable location(s). The ceramic feed line 112 and the chemical treatment agent feed line 114 can be coupled to the vessel 106 at one or more locations between the first end 130 and the second end 132 of the vessel 106. An infused product outlet line 128 can be coupled to the vessel 106 at any suitable location, for example a location proximate the second end 132 of the vessel 106.

Referring now to FIG. 1, in operation, a porous ceramic proppant composition can be introduced to the mixing vessel 106 via the ceramic feed line 112. The porous ceramic proppant composition introduced to the vessel 106 via line 112 can include any suitable ceramic particulates. Suitable ceramic particulates can be any one or more of lightweight ceramic proppant, intermediate strength proppant, high strength proppant, as well as any porous ceramic proppant. According to several exemplary embodiments, the ceramic particulates include silica and/or alumina in any suitable amounts. According to several exemplary embodiments, the porous ceramic proppant includes less than 80 wt %, less than 60 wt %, less than 40 wt %, less than 30 wt %, less than 20 wt %, less than 10 wt %, or less than 5 wt % silica based on the total weight of the proppant. According to several exemplary embodiments, the porous ceramic proppant includes from about 0.1 wt % to about 70 wt % silica, from about 1 wt % to about 60 wt % silica, from about 2.5 wt % to about 50 wt % silica, from about 5 wt % to about 40 wt % silica, or from about 10 wt % to about 30 wt % silica. According to several exemplary embodiments, the porous ceramic proppant includes at least about 30 wt %, at least about 50 wt %, at least about 60 wt %, at least about 70 wt %, at least about 80 wt %, at least about 90 wt %, or at least about 95 wt % alumina based on the total weight of the proppant. According to several exemplary embodiments, the porous ceramic proppant include from about 30 wt % to about 99.9 wt % alumina, from about 40 wt % to about 99 wt % alumina, from about 50 wt % to about 97 wt % alumina, from about 60 wt % to about 95 wt % alumina, or from about 70 wt % to about 90 wt % alumina.

The porous ceramic proppant can also include proppant manufactured according to vibration-induced dripping methods, herein called "drip casting." Suitable drip casting methods and proppants made therefrom are disclosed in U.S. Pat. Nos. 8,865,631 and 8,883,693, U.S. Patent Application Publication No. 2012/0227968, and U.S. patent application Ser. Nos. 14/502,483 and 14/802,761, the entire disclosures of which are incorporated herein by reference. Proppants produced from the drip cast methods can have a specific gravity of at least about 2.5, at least about 2.7, at least about 3, at least about 3.3, or at least about 3.5. Proppants produced from the drip cast methods can have a specific gravity of less than 5, less than 4.5, or less than 4. The drip cast proppants can also have a surface roughness of less than 5 μm, less than 4 μm, less than 3 μm, less than 2.5 μm, less than 2 μm, less than 1.5 μm, or less than 1 μm. In one or more exemplary embodiments, the drip cast proppants have an average largest pore size of less than about 25 μm, less than about 20 μm, less than about 18 μm, less than about 16 μm, less than about 14 μm, or less than about 12 μm and/or a standard deviation in pore size of less than 6 μm, less than 4 μm, less than 3 μm, less than 2.5 μm, less than 2 μm, less than 1.5 μm, or less than 1 μm. In one or more exemplary embodiments, the drip cast proppants have less than 5,000, less than 4,500, less than 4,000, less than 3,500, less than 3,000, less than 2,500, or less than 2,200 visible pores at a magnification of 500× per square millimeter of proppant particulate.

According to several exemplary embodiments, the porous ceramic proppant are substantially round and spherical having a size in a range between about 6 and 270 U.S. Mesh. For example, the size of the proppant can be expressed as a grain fineness number (GFN) in a range of from about 15 to about 300, or from about 30 to about 110, or from about 40 to about 70. According to such examples, a sample of porous ceramic proppant can be screened in a laboratory for separation by size, for example, intermediate sizes between 20, 30, 40, 50, 70, 100, 140, 200, and 270 U.S. mesh sizes to determine GFN. The correlation between sieve size and GFN can be determined according to Procedure 106-87-S of the American Foundry Society Mold and Core Test Handbook, which is known to those of ordinary skill in the art.

According to several exemplary embodiments, the porous ceramic proppant can have any suitable size. For example, the porous ceramic proppant can have a mesh size of at least about 6 mesh, at least about 10 mesh, at least about 16 mesh, at least about 20 mesh, at least about 25 mesh, at least about 30 mesh, at least about 35 mesh, or at least about 40 mesh. According to several exemplary embodiments, the porous ceramic proppant have a mesh size from about 6 mesh, about 10 mesh, about 16 mesh, or about 20 mesh to about 25 mesh, about 30 mesh, about 35 mesh, about 40 mesh, about 45 mesh, about 50 mesh, about 70 mesh, or about 100 mesh. According to several exemplary embodiments, the porous ceramic proppant have a mesh size from about 4 mesh to about 120 mesh, from about 10 mesh to about 60 mesh, from about 16 mesh to about 20 mesh, from about 20 mesh to about 40 mesh, or from about 25 mesh to about 35 mesh.

According to several exemplary embodiments, the porous ceramic proppant can have any suitable shape. The porous ceramic proppant can be substantially round, cylindrical, square, rectangular, elliptical, oval, egg-shaped, or pill-shaped. For example, the porous ceramic proppant can be substantially round and spherical. According to several exemplary embodiments, the porous ceramic proppant can have an apparent specific gravity of less than 4.0 g/cm$^3$, less than 3.6 g/cm$^3$, less than 3.3 g/cm$^3$, less than 3.1 g/cm$^3$, less than 3.0 g/cm$^3$, less than 2.8 g/cm$^3$, or less than 2.5 g/cm$^3$. According to several exemplary embodiments, the porous ceramic proppant can have an apparent specific gravity of from about 3.1 to 3.4 g/cm$^3$, from about 1.5 to about 2.5 g/cm$^3$, or from about 2.6 to about 3.2 g/cm$^3$.

The porous ceramic proppant can have any suitable bulk density. In one or more exemplary embodiments, the porous ceramic proppant has a bulk density of less than 3 g/cc, less than 2.5 g/cc, less than 2.2 g/cc, less than 2 g/cc, less than 1.8 g/cc, less than 1.6 g/cc, or less than 1.5 g/cc. The porous ceramic proppant can have a bulk density of about 1 g/cc, about 1.15 g/cc, about 1.25 g/cc, about 1.35 g/cc, or about 1.45 g/cc to about 1.5 g/cc, about 1.6 g/cc, about 1.75 g/cc, about 1.9 g/cc, or about 2.1 g/cc or more. For example, the porous ceramic proppant can have a bulk density of about 1.3 g/cc to about 1.8 g/cc, about 1.35 g/cc to about 1.65 g/cc, or about 1.5 g/cc to about 1.9 g/cc.

According to several exemplary embodiments, the porous ceramic proppant can have any suitable porosity. The porous ceramic proppant can have an internal interconnected porosity from about 1%, about 2%, about 4%, about 6%, about 8%, about 10%, about 12%, or about 14% to about 18%, about 20%, about 22%, about 24%, about 26%, about 28%, about 30%, about 34%, about 38%, about 45%, about 55%, about 65%, or about 75% or more. In several exemplary embodiments, the internal interconnected porosity of the porous ceramic proppant is from about 5% to about 75%, about 5% to about 15%, about 10% to about 30%, about 15% to about 35%, about 25% to about 45%, about 30% to about 55%, or about 35% to about 70%. According to several exemplary embodiments, the porous ceramic proppant can have any suitable average pore size. For example, the porous ceramic proppant can have an average pore size from about 2 nm, about 10 nm, about 15 nm, about 55 nm, about 110 nm, about 520 nm, or about 1,100 to about 2,200 nm, about 5,500 nm, about 11,000 nm, about 17,000 nm, or about 25,000 nm or more in its largest dimension. For example, the porous ceramic proppant can have an average pore size can be from about 3 nm to about 30,000 nm, about 30 nm to about 18,000 nm, about 200 nm to about 9,000, about 350 nm to about 4,500 nm, or about 850 nm to about 1,800 nm in its largest dimension.

According to several exemplary embodiments of the present invention, the microwave-infused, porous ceramic particulates, referred to hereinafter as "microwave-infused proppant" can be made from conventional pre-sintered proppants such as ceramic proppant. Such conventional proppants can be manufactured up to the sintering step according to any suitable process including, but not limited to continuous spray atomization, spray fluidization, spray drying, or compression. Suitable conventional proppants and methods for their manufacture up to the sintering step are disclosed in U.S. Pat. Nos. 4,068,718, 4,427,068, 4,440,866, and 5,188,175, the entire disclosures of which are incorporated herein by reference. The ceramic proppant can also be manufactured in a manner that creates porosity in the proppant grain. A process to manufacture a suitable porous ceramic proppant is described in U.S. Pat. No. 7,036,591, the entire disclosure of which is incorporated herein by reference.

According to several exemplary embodiments, the porous ceramic proppant has any suitable permeability and fluid conductivity in accordance with ISO 13503-5: "Procedures for Measuring the Long-term Conductivity of Proppants," and expressed in terms of Darcy units, or Darcies (D). The porous ceramic proppant can have a long term permeability at 7,500 psi of at least about 1 D, at least about 2 D, at least about 5 D, at least about 10 D, at least about 20 D, at least about 40 D, at least about 80 D, at least about 120 D, or at least about 150 D. The porous ceramic proppant can have a long term permeability at 12,000 psi of at least about 1 D, at least about 2 D, at least about 3 D, at least about 4 D, at least about 5 D, at least about 10 D, at least about 25 D, or at least about 50 D. The porous ceramic proppant can also have a long term conductivity at 7,500 psi of at least about 100 millidarcy-feet (mD-ft), at least about 200 mD-ft, at least about 300 mD-ft, at least about 500 mD-ft, at least about 1,000 mD-ft, at least about 1,500 mD-ft, at least about 2,000 mD-ft, or at least about 2,500 mD-ft. For example, the porous ceramic proppant can have a long term conductivity at 12,000 psi of at least about 50 mD-ft, at least about 100 mD-ft, at least about 200 mD-ft, at least about 300 mD-ft, at least about 500 mD-ft, at least about 1,000 mD-ft, or at least about 1,500 mD-ft.

In certain embodiments, the porous ceramic proppant has a crush strength at 10,000 psi of from about 5% to about 8.5%, and a long-term fluid conductivity at 10,000 psi of from about 2500 mD-ft to about 3000 mD-ft. In certain other embodiments, the porous ceramic proppant has a crush strength at 10,000 psi of from about 5% to about 7.5%.

In several exemplary embodiments, the porous ceramic proppants have a crush strength at 7,500 psi of from about 1%, about 1.5%, about 2.0%, or about 2.5% to about 3.0%, about 3.5%, about 4.0%, or about 4.5%, long term fluid conductivity at 7,500 psi of from about 1,475 mD-ft, about 1,800 mD-ft, about 2,250 mD-ft, about 2,750 mD-ft, or about 3,500 mD-ft to about 4,500 mD-ft, about 5,500 mD-ft, about 6,500 mD-ft, about 7,500 mD-ft, or about 8,825 mD-ft and a long term permeability at 7,500 psi of from about 90 D to about 480 D, about 150 D to about 475 D, about 250 D to about 450 D, or about 375 D to about 425 D. In several exemplary embodiments, the porous ceramic proppants have a crush strength at 7,500 psi of from about 1.5% to about 3.2%, about 1.8% to about 2.9%, or about 2.1% to about 2.6%.

In several exemplary embodiments, the porous ceramic proppants have a long term fluid conductivity at 10,000 psi of from about 2,000 mD-ft, about 2,250 mD-ft, or about 2,400 mD-ft to about 2,500 mD-ft, about 2,650 mD-ft, about 2,750 mD-ft, or about 3,500 mD-ft and a long term permeability at 10,000 psi of from about 130 D to about 165 D, about 140 D to about 160 D, about 145 D to about 155 D, or about 160 D to about 280 D. In several exemplary embodiments, the porous ceramic proppants have a long term fluid conductivity at 12,000 psi of from about 1,000 mD-ft, about 1,250 mD-ft, or about 1,400 mD-ft to about 1,500 mD-ft, about 1,650 mD-ft, about 1,750 mD-ft, about 2,000 mD-ft, about 2,500 mD-ft, or about 2,800 mD-ft and a long term permeability at 12,000 psi of from about 75 D to about 105 D, about 85 D to about 100 D, about 95 D to about 100 D, or about 105 D to about 240 D.

A chemical treatment agent can be introduced to the mixing vessel 106 via the chemical treatment agent feed line 114. The chemical treatment agent introduced to the vessel 106 via line 114 can include any element, compound, or composition suitable for providing some function that is useful for the production performance of a hydraulically fractured well. Suitable chemical treatment agents can be or include any one or more of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, surfactants, combinations thereof, or any other oilfield chemical that can be helpful in the hydraulic fracturing process.

In one or more exemplary embodiments, the scale inhibitor can inhibit scales of calcium, barium, magnesium salts and the like, including barium sulfate, calcium sulfate, and calcium carbonate scales. The composites can further have applicability in the treatment of other inorganic scales, such as zinc sulfide, iron sulfide, etc. In one or more exemplary embodiments, the scale inhibitors are anionic scale inhibitors. The scale inhibitors can include strong acids such as a phosphonic acid, phosphoric acid, phosphorous acid, phosphate esters, phosphonate/phosphonic acids, aminopoly carboxylic acids, chelating agents, and polymeric inhibitors and salts thereof. The scale inhibitors can also include organo phosphonates, organo phosphates and phosphate esters as well as the corresponding acids and salts thereof. The scale inhibitors can also include polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS). In one or more exemplary embodiments, the scale inhibitors can include DTPA, (also known as diethylenetriaminepentaacetic acid; diethylenetriamine-N,N,N',N',N''-pentaacetic acid; pentetic acid; N,N-Bis(2-(bis-(carboxymethyl)amino)ethyl)-glycine; diethylenetriamine pentaacetic acid, [[(Carboxymethyl)imino]bis(ethylenenitrilo)]-tetra-acetic acid); EDTA: (also known as edetic acid; ethylenedinitrilotetraacetic acid; EDTA free base; EDTA free acid; ethylenediamine-N,N,N', N'-tetraacetic acid; hampene; Versene; N,N'-1,2-ethane diyl-bis-(N-(carboxymefhyl)glycine); ethylenediamine tetra-acetic acid); NTA, (also known as N,N-bi s(carboxymethyl) glycine; triglycollamic acid; trilone A; alpha,alpha',alpha''-trimethylaminetricarboxylic acid; tri(carboxymethyl)amine; aminotriacetic acid; Hampshire NTA acid; nitrilo-2,2',2''-triacetic acid; titriplex i; nitrilotriacetic acid); APCA (aminopolycarboxylic acids); phosphonic acids; EDTMP (ethylenediaminetetramethylene-phosphonic acid); DTPMP (diethylene triaminepentamethylenephosphonic acid); NTMP (nitrilotrimethylenephosphonic acid); polycarboxylic acids, gluconates, citrates, polyacrylates, and polyaspartates or any combination thereof. The scale inhibitors can also include any of the ACCENT™ scale inhibitors, commercially available from The Dow Chemical Company. The scale inhibitors can also include potassium salts of maleic acid copolymers. In one or more exemplary embodiments, the chemical treatment agent is DTPMP.

In one or more exemplary embodiments, the chemical treatment agent can be or include any one or more demulsifying agents. The demulsifying agents can include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of same. The demulsifying agents can also include oxyalkylated phenol formaldehyde resins, oxyalkylated amines and polyamines, di-epoxidized oxyalkylated polyethers, poly triethanolamine methyl chloride quaternary, melamine acid colloid, and aminomethylated polyacrylamide.

In one or more exemplary embodiments, the chemical treatment agent can be or include any one or more corrosion inhibitors. Suitable corrosion inhibitors can include, but are not limited to, fatty imidazolines, alkyl pyridines, alkyl pyridine quaternaries, fatty amine quaternaries and phosphate salts of fatty imidazolines. In one or more exemplary embodiments, the chemical treatment agent can be or include any one or more suitable foaming agents. Suitable foaming agents can include, but are not limited to, oxyalkylated sulfates or ethoxylated alcohol sulfates, or mixtures thereof. In one or more exemplary embodiments, the chemical treatment agent can be or include any one or more suitable oxygen scavengers. Suitable oxygen scavengers can include triazines, maleimides, formaldehydes, amines, carboxamides, alkylcarboxyl-azo compounds cumine-peroxide compounds morpholino and amino derivatives morpholine and piperazine derivatives, amine oxides, alkanolamines, aliphatic and aromatic polyamines.

In one or more exemplary embodiments, the chemical treatment agent can be or include any one or more salt inhibitors. In one or more exemplary embodiments, the salt inhibitor can include any suitable salt inhibitor, including, but not limited to NA-MINUS®, NA-MINUS®-55, and WFT 9725, each commercially available from Weatherford International Ltd., DESALT LIQUID salt inhibitor commercially available from JACAM Chemicals, LLC, and potassium ferricyanide and any combination thereof.

In one or more exemplary embodiments, the chemical treatment agent can be or include any one or more paraffin inhibitors. Suitable paraffin inhibitors can include, but are not limited to, ethylene/vinyl acetate copolymers, acrylates (such as polyacrylate esters and methacrylate esters of fatty alcohols), and olefin/maleic esters. In one or more exemplary embodiments, the chemical treatment agent can be or include any one or more asphaltene inhibitors. Suitable asphaltene inhibitors can include, but are not limited to, asphaltene treating chemicals include but are not limited to fatty ester homopolymers and copolymers (such as fatty esters of acrylic and methacrylic acid polymers and copolymers) and sorbitan monooleate.

In one or more exemplary embodiments, the chemical treatment agent can be or include any one or more suitable surfactants. The one or more suitable surfactants can be selected based on the necessary adjustment in wetting characteristics of the proppant for the desired production enhancement. For example, suitable surfactants can be found in U.S. Patent Application Publication No. 2005/0244641, incorporated by reference herein in its entirety. The surfactants can also be selected from any number of surfactants known to those of ordinary skill in the art, including, for example, anionic, cationic, nonionic, and amphoteric surfactants, or combinations thereof. According to several exemplary embodiments, suitable surfactants include but are not limited to saturated or unsaturated long-chain fatty acids or acid salts, long-chain alcohols, polyalcohols, dimethylpolysiloxane and polyethylhydrosiloxane. According to several exemplary embodiments, suitable surfactants include but are not limited to linear and branched carboxylic acids and acid salts having from about 4 to about 30 carbon atoms, linear and branched alkyl sulfonic acids and acid salts having from about 4 to about 30 carbon atoms, linear alkyl benzene sulfonate wherein the linear alkyl chain includes from about 4 to about 30 carbon atoms, sulfosuccinates, phosphates, phosphonates, phospholipids, ethoxylated compounds, carboxylates, sulfonates and sulfates, polyglycol ethers, amines, salts of acrylic acid, pyrophosphate and mixtures thereof. Cationic surfactants can include those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group can include quaternary ammonium halide or quaternary amine, such as quaternary ammonium chloride or a quaternary ammonium bromide. Amphoteric surfactants can include glycinates, amphoacetates, propionates, betaines and mixtures thereof. Anionic surfactants can include sulfonates (like sodium xylene sulfonate and sodium naphthalene sulfonate), phosphonates, ethoxysulfates and mixtures thereof. According to several exemplary embodiments, suitable surfactants include but are not limited to sodium stearate, octadecanoic acid, hexadecyl sulfonate, lauryl sulfate, sodium oleate, ethoxylated nonyl phenol, sodium dodecyl sulfate, sodium dodecylbenzene sulfonate, laurylamine hydrochloride, trimethyl dodecylammonium chloride, cetyl trimethyl ammonium chloride, polyoxyethylene alcohol, alkylphenolethoxylate, Polysorbate 80, propylene oxide modified polydimethylsiloxane, dodecyl betaine, lauramidopropyl betaine, cocamido-2-hydroxy-propyl sulfobetaine, alkyl aryl sulfonate, fluorosurfactants and perfluoropolymers and terpolymers, castor bean adducts and combinations thereof. According to several exemplary embodiments, the surfactant is sodium dodecylbenzene sulfonate or sodium dodecyl sulfate. According to several exemplary embodiments, the surfactants are used at a concentration below the critical micelle concentration (CMC) in aqueous and hydrocarbon carrier fluids. Further, surfactants as production enhancement additives are commercially available from CESI Chemical, Inc., as SG-400N, SG-401N, and LST-36.

In one or more exemplary embodiments, the chemical treatment agent can be or include any suitable nanoparticle dispersion. The nanoparticle dispersion can be coated on and/or infused in the proppant so that the proppant can act as a carrier for the nanoparticle dispersion in a hydraulic fracturing operation. The inclusion of the nanoparticle dispersion into and/or underneath the coating of coated proppant or into the internal porosity of porous ceramic proppant, rather than simply injecting or pumping the nanoparticle dispersion into a well formation in fluid form, improves not only the wetting characteristics of the formation surfaces but also of the proppant itself. The nanoparticle dispersion interacts with the surface of the proppant to alter its wetting characteristics. Further, as fluids flow through the proppant pack in the formation, some of the nanoparticle dispersion can be released into the fracture and adhere to and improve the wettability of the formation surfaces. Thus, the use of nanoparticle dispersions that are coated on and/or infused into proppant offers benefits similar to those obtained by pumping the nanoparticle dispersion into the formation in fluid form, but the increased interaction of the nanoparticle dispersion with the proppant offers the additional benefit of improved wettability of the proppant.

The nanoparticle dispersions can include a number of different nanoparticle materials known to those of ordinary skill in the art, including polymers, silica, metals, metal oxides, and other inorganic materials, that are suspended in an aqueous or non-aqueous solvent fluid. According to several exemplary embodiments, suitable materials include but are not limited to nanoparticles such as silicon dioxide, zirconium dioxide, antimony dioxide, zinc oxide, titanium dioxide, aluminum dioxide, particles derived from natural minerals, synthetic particles, and combinations thereof. According to several exemplary embodiments, one or more of silicon dioxide, zirconium dioxide and antimony dioxide are added at about 65 nanometers or less in diameter (in several exemplary embodiments 1-10 nm) and have a polydispersity of less than about 20%.

The selection of a specific nanoparticle dispersion or surfactant to be coated on and/or infused into the porous ceramic proppant depends on the necessary adjustment in wetting characteristics of the proppant for the desired production enhancement. Suitable nanoparticle dispersions or surfactants can be selected from any number of commercially available products. For example, nanoparticle dispersion products are commercially available from FTS International® as NPD 2000 ® and NPD 3000 ®. Nanoparticle dispersions are also commercially available from CESI Chemical, Inc., a subsidiary of Flotek Industries, Inc., as MA-844W, MA-845, StimOil® FBA M, StimOil® FBA Plus, and StimOil® FBA Plus Enviro.

In one or more exemplary embodiments, the chemical treatment agent can be or include any one or more suitable gel breakers. Suitable gel breakers can be or include oxidizers such as bleach, hypochlorites, percarbonates, perborates, permanganates, peroxides, and halogens. In one or more exemplary embodiments, the chemical treatment agent can be or include any one or more suitable biocides. Suitable biocides can be or include bronopol, dazomet, glutaraldehyde, quartenary ammonium salts, and bleach.

In one or more exemplary embodiments, the chemical treatment agent can be or include any suitable tracer, such as one or more metallic or non-metallic elements, one or more nanoparticles, and/or one or more biological markers. According to several exemplary embodiments, the biological marker is DNA. DNA, or deoxyribose nucleic acid, is sometimes a double-stranded helical molecule that encodes the genetic information of almost all living systems. Each DNA molecule can be unique as a result of a particular sequence of nitrogenous bases—adenine ("A"), thymine ("T"), cytosine ("C") and guanine ("G")— contained with the molecule. The double helix structure is formed and maintained by the pairing of a nitrogenous base on one phosphate/sugar backbone carrier chain with a nitrogenous base on the other phosphate/sugar backbone carrier chain through hydrogen bonding. Specifically, an adenine base will pair with a thymine base (an "AT" base pair), and a cytosine base will pair with a guanine base (a "GC" base pair). Probability terms can be calculated for the frequency of a given sequence of bases, and as long as a large enough DNA molecule is used, the "uniqueness" of a particular molecule of DNA can be known with sufficient certainty. The DNA molecule can be naturally occurring or a manufactured (synthetic) DNA and can be double stranded or single stranded. Synthetic DNA is commercially available and can be manufactured to order by several specialized DNA manufacturers, such as GenScript, Synthetic Genomics, DNA 2.0, Genewiz, Inc., Life Technologies, and Cambrian Genomics. Further, the DNA can be "encapsulated" to enhance its survivability at downhole reservoir conditions and to otherwise alter its interaction with formation fluids. Additionally, specific DNA sequences can be selected for use based on compatibility with the thermal environment of a specific well.

The DNA alone can be used as the biological marker. DNA can be water-soluble and can be infused into a porous ceramic proppant without any modification in order to function as a water-soluble biological marker. According to several exemplary embodiments, the DNA can be formulated in such a way that it is hydrocarbon-soluble and will separate into hydrocarbon fluids as well. For example, the water-solubility of DNA is due to the negative charges associated with the phosphodiester groups of the DNA. The negative charges of the phosphodiester structures can be removed by methylation. Methylation of this region of the DNA molecule can ensure that this part of the molecule becomes hydrophobic, i.e., hydrocarbon-soluble, thereby ensuring that the DNA molecule is soluble in the hydrocarbon phase. Other procedures for formulating hydrocarbon-soluble DNA can be found in U.S. Pat. No. 5,665,538, the entire disclosure of which is herein incorporated by reference.

While DNA itself can be used as a biological marker, the reservoir conditions in which the DNA is placed may not be optimal for the long term survivability of the DNA. These conditions include reservoir temperatures exceeding 200° F. and sometimes up to 400° F., as well as highly saline formation waters. However, by encapsulating the DNA, its survivability in harsh conditions can be greatly enhanced. The partitioning of the DNA, whether into the hydrocarbon or water phase, can be tailored by tailoring the encapsulation material.

Additionally, molecules containing specific nucleotide sequences can be selectively used to enhance compatibility with the harsh wellbore and formation temperatures and pressures based on the improved thermal stability displayed by DNA molecules having higher concentrations of certain base pairs. Specifically, the DNA molecules having the greatest thermal resistance are those which include higher levels of GC base pairs and lower levels of AT base pairs. For example, the sequence GCAT (with corresponding base pair sequence CGTA) shows thermal stability at temperatures of from about 186 to 221° F. The sequence GCGC (with corresponding base pair sequence CGCG) is thermally resistant at temperatures of up to about 269 to 292° F. Conversely, the inclusion of higher levels of AT base pairs reduces thermal stability. For example, some thymine in the combination reduces the stability such that the sequence ATCG (with corresponding base pair sequence TAGC) only survives at temperatures of up to about 222 to 250° F., while the sequence TATA (with corresponding base pair sequence ATAT) is thermally stable at temperatures of up to only about 129 to 175° F. In addition, if the DNA molecules that include the sequence ATCG (with corresponding base pair sequence TAGC) are manipulated to include a modification known as G-clamp, the thermal stability increases by an additional 32° F. or from temperatures of up to about 254 to 282° F. As shown below, the G-clamp modification involves adding a tricyclic analogue of cytosine giving the duplex base pair (G-C) an additional hydrogen bond.

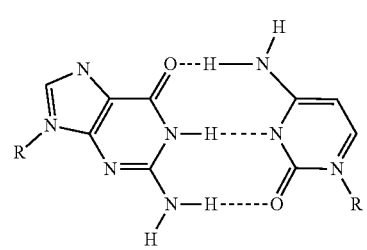

G-C

G-G-clamp

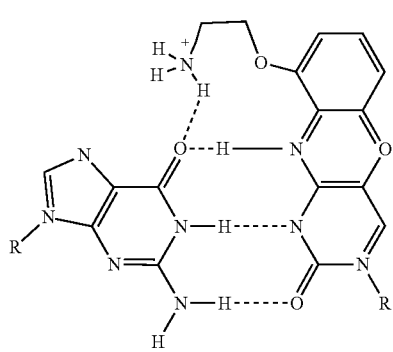

By increasing the hydrogen bonding of the duplex base pair from 3 to 4, the thermal stability increases by an additional 32° F.

The DNA can be either single stranded or double stranded. The natural orientation of DNA in the double stranded version is the Watson-Crick pairing. Synthetic DNA, however, is not constrained in the same way as natural DNA. Still, the indicator of thermal stability is a thermodynamic reorientation of the strands and consists primarily of the strands separating into two single strands. This is known as melting and happens over a narrow temperature range. What has been observed is that the DNA of some organisms resists this thermal collapse, examples being certain thermophilic organisms. Analysis of their genomes gives a direct correlation between the levels of G-C DNA in the sequences. Essentially, thermal stability is directly related to the number of hydrogen bonds between the bases in the duplex pairs. However, the stacking (pairing in the double strands) is also a factor. It has been determined that an important feature of thermal stability in natural DNA relies heavily upon the molar ratio of G-C pairing since this gives the highest density of hydrogen bonds. Thermal stability ultimately depends upon the so-called melting point where the strands of a double stranded DNA separate. This has no significance to single stranded synthetic DNA, however, which is already separated. The separation of the strands of double stranded DNA which occurs at the melting point is to some extent reversible. The strands can re-join once the temperature drops sufficiently. The thermal stability depends upon the thermal resistance of the base pairs or duplex units as well as the stacking forces which join the strands of double stranded DNA. As noted above, thermal stability can also be improved by modifying the molecular arrangement within a particular base pair. For instance, in addition to the G-G-Clamp modification noted above, the thermal stability of an A-T base pair can be improved, as shown below, by modifying the adenine-thymine base pair to include a 2-aminoadenine-T complex which increases the hydrogen bonding in the complex from 2 to 3 and increases its thermal stability by about 5° F.

A-T

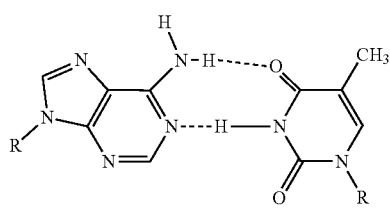

2-aminoadenine-T

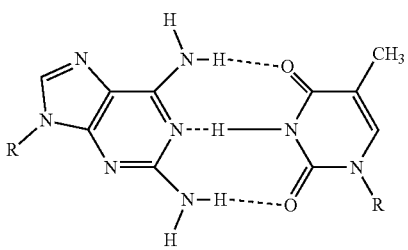

The thermal stability of specific base pairs can be used to generate a thermodynamic assessment of potential. As noted above, reasonable chemical modifications can extend this thermal range and retain the essential features of DNA for the purposes of measurement. The chemical nature of DNA means that it is susceptible to hydrolysis and the rate of hydrolysis increases with increasing temperature. Hydrolysis is another route for the decomposition of DNA in addition to decomposition due to its melting behavior as discussed above. That said, it is known that a number of organisms survive extremes of temperature which means that their genetic material must have some inherent thermal stability. This response has been directly correlated to the molar fraction of G-C base pairs irrespective of whether such base pairs are present as single or double strands. Natural DNA, however, is chromosomal and so must be double stranded.

Also it has been shown that the repetition of the G-C duplex appears to impart more stability since it has a direct effect upon the thermal resistance of the DNA. This shows how various organisms cope with high temperature by incorporating a larger G-C molar fraction into their genome. It appears that the molar fraction of G-C is the key rather than any weak link, which might be incorporated into the sequence. Chain terminators appear to have little overall effect on the thermal stability of the DNA. Essentially, what this means is that the molar fraction of certain base pairs in the DNA sequence can be varied according to the temperature range required. Getting down to the detail of destruction reactions for the DNA sequence will depend upon the environment to which a particular DNA sequence will be subjected and the exposure to hydrolysis reactions are an area of concern. However the modifications of the base pairs discussed above which can be introduced while still retaining the inherent features which make DNA an ideal tracer offer clear routes for tailor-made tracers for oilfield use.

Selectively using a specific DNA molecule as a biological marker based on its thermal stability properties allows for the use of DNA as a biological marker over a far wider range of conditions than is currently possible. Further, the survival of the DNA molecules at higher temperatures allows for accurate detection even with very low levels of DNA present in the formation by avoiding degradation of the DNA. Additionally, the diverse number of unique DNA molecules vastly adds to the number of unique tracers which can be applied in the oilfield, thereby greatly increasing both the range and diversity of oilfield operations to which biological markers can be applied and greatly improving the knowledge and understanding of increasingly complex wells and their behavior. This knowledge will lead to better completion and stimulation practices resulting in cost savings and improved well performance.

In several exemplary embodiments, a DNA molecule exhibiting specific thermostability properties, based on its specific nitrogenous base composition that are compatible with the thermal environment of a specific well, can be selectively infused into a porous proppant to be used in the well operations according to the methods and embodiments described herein. For example, for wells exhibiting temperatures of up to about 269 to 292° F., a DNA molecule containing the GCGC sequence can be synthesized and infused into the proppant to be injected into the well formation. This DNA molecule would better withstand the thermal conditions of the well, thereby allowing it to be more effectively used as a biological marker that conveys information regarding well formation and production.

According to several exemplary embodiments, the chemical treatment agent, such as a biological marker separates from the porous ceramic proppant continuously over a period of up to about one year, up to about five years, or up to about ten years after placement of the proppant in the hydraulically created fracture. Systems, techniques and compositions for providing for the sustained release of DNA are well known to those of ordinary skill in the art. For example, European Patent No. 1,510,224, the entire disclosure of which is incorporated herein by reference, discloses several methods for enabling the sustained release of DNA over a period of time. According to several exemplary embodiments, DNA is encapsulated with a polymer or a material infused with DNA is coated with a permeable nondegradeable coating. In several exemplary embodiments, the encapsulating polymer includes one or more of high melting acrylate-, methacrylate- or styrene-based polymers, block copolymers of polylactic-polyglycolic acid, polyglycolics, polylactides, polylactic acid, gelatin, water-soluble polymers, cross-linkable water-soluble polymers, lipids, gels, silicas, or other suitable encapsulating materials. Additionally, the encapsulating polymer can include an encapsulating material that comprises a linear polymer containing degradable co-monomers or a cross-linked polymer containing degradable cross-linkers.

According to several exemplary embodiments, after the chemical treatment agent, such as a biological marker separates from the porous ceramic proppant and partitions into a production fluid, the production fluid will then transport the biological marker to the surface. Once the production fluids reach the surface, the fluids can be analyzed for the presence of the biological marker.

Returning to FIG. 1, the chemical treatment agent can be mixed with a carrier solution to provide a chemical treatment agent solution. The chemical treatment agent can be mixed with the carrier solution before, after, or during introduction to the mixing vessel 106 and/or the chemical agent feed line 114. For example, the chemical treatment agent can be mixed with the carrier solution before entering the chemical agent feed line 114 in order that the chemical treatment agent solution enters the mixing vessel 106 via line 114.

The carrier solution can be in the form of an aqueous phase solution or an organic phase solution. In one or more exemplary embodiments, the carrier solution is an aqueous phase solution. For example, the carrier solution can be or include water in any amounts. The carrier solution can include at least about 1 wt %, at least about 2 wt %, at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 65 wt %, at least about 75 wt %, at least about 85 wt %, at least about 90 wt %, at least about 95 wt %, at least about 99 wt %, at least about 99.9 wt %, or 100 wt % liquid water.

In one or more exemplary embodiments, the carrier solution is an organic phase solution. For example, the carrier solution can be or include solvent and/or hydrocarbons in any amounts. The carrier solution can include at least about 1 wt %, at least about 2 wt %, at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 65 wt %, at least about 75 wt %, at least about 85 wt %, at least about 90 wt %, at least about 95 wt %, at least about 99 wt %, at least about 99.9 wt %, or 100 wt % liquid hydrocarbons.

The solvent can be or include dichloromethane, tetrahydrofuran, ethyl acetate, acetone, dimethylformamide, acetonitrile, dimethyl sulfoxide, propylene carbonate, formic acid, acetic acid, or nitromethane, or any combination thereof. The carrier solution can be or include alcohol in any amounts. The carrier solution can include at least about 50 wt %, at least about 75 wt %, at least about 85 wt %, at least about 90 wt %, at least about 95 wt %, at least about 99 wt %, at least about 99.9 wt %, or 100 wt % alcohol. The alcohol can be or include methanol, ethanol, n-butanol, isopropyl alcohol, butyl alcohol, pentanol, cetyl alcohol, ethylene glycol, propylene glycol, glycerol, or allyl alcohol, or any combination thereof.

In one or more exemplary embodiments, the carrier solution includes any carrier or carrier solution disclosed above in a solid form or solid phase. The carrier solution can be a solid at ambient conditions or room temperature. For example, the carrier solution can be introduced to the mixing vessel in the form of a solid. The solid phase carrier solution can be or include one or more waxes, paraffins, polymeric compositions, or other non-metallic solids that can be melted and infused into the pores and interstitial spaces of ceramic proppant. For example, the microwave energy emitted from microwave generators 102, 104 can melt or soften the solid phase carrier solution to a viscosity sufficient to enter the pores and interstitial spaces of porous ceramic proppant via capillary pressure. Thermal energy or heat other than microwave energy emitted from microwave generators 102, 104 can also melt or soften the solid phase carrier solution to a viscosity sufficient to enter the pores and interstitial spaces of porous ceramic proppant via capillary pressure.

The chemical treatment agent solution can contain the carrier solution in any suitable amounts. The chemical treatment agent solution can include from about 10 wt %, about 20 wt %, about 30 wt %, about 40 wt %, or about 45 wt % to about 55 wt %, about 60 wt %, about 70 wt %, about 80 wt % or about 90 w % carrier solution based on the total weight of the chemical treatment agent solution. For example, the chemical treatment agent solution can include from about 25 wt % to about 95 wt %, from about 35 wt % to about 85 wt %, from about 42 wt % to about 65 wt %, from about 48 wt % to about 58 wt %, or from about 50 wt % to about 55 wt % carrier solution. The chemical treatment agent solution can also include from about 0.01 wt %, about 0.05 wt %, about 0.1 wt %, about 0.5 wt %, about 1 wt %, about 2 wt %, about 5 wt %, about 10 wt %, about 20 wt %, about 30 wt %, about 40 wt %, or about 45 wt % to about 55 wt %, about 60 wt %, about 70 wt %, about 80 wt % or about 90 w % chemical treatment agent based on the total weight of the chemical treatment agent solution. For example, the chemical treatment agent solution can include from about 1 wt % to about 6 wt %, about 5 wt % to about 65 wt %, from about 15 wt % to about 68 wt %, from about 25 wt % to about 62 wt %, from about 35 wt % to about 60 wt %, from about 40 wt % to about 58 wt %, from about 45 wt % to about 55 wt %, or from about 46 wt % to about 52 wt % chemical treatment agent. The chemical treatment agent solution can include any suitable ratio of chemical treatment agent to carrier solution. For example, the chemical treatment agent solution can include a chemical treatment agent to carrier solution weight ratio of about 1:10, about 1:5, about 1:3, about 2:5, about 1:2, about 3:5, about 2:3, or about 4:5 to about 5:4, about 3:2, about 5:3, about 2:1, about 5:2, about 3:1, about 5:1, or about 10:1. In one or more exemplary embodiments, the chemical treatment agent to carrier solution weight ratio is about 1:1. In one or more exemplary embodiments, the chemical treatment agent is the carrier solution. The chemical treatment agent solution can have any suitable viscosity at ambient conditions. For example, the chemical treatment agent solution can have a viscosity at 21° C. of about 5 centipoise (cP), about 15 cP, about 25 cP, about 50 cP, or about 100 cP to about 125 cP, about 150 cP, about 200 cP, about 300 cP, or about 500 cP or more.

The carrier solution and the chemical treatment agent can have any suitable polarity. In one or more exemplary embodiments, the carrier solution has a polarity greater than that of the chemical treatment agent. For example, the chemical treatment agent can be non-polar. The increased polarity of the carrier solution in relation to the chemical treatment agent can allow the microwave energy to heat the carrier solution to a greater temperature prior to heating of the chemical treatment agent, thus causing the carrier solution to vaporize prior to vaporization of the chemical treatment agent.

The porous ceramic proppant and the chemical treatment agent solution can be added to the vessel 106 in any suitable amounts and mixed together to provide an infusion mixture 116 disposed within the vessel 106. The infusion mixture 116 can include any suitable ratio of chemical treatment agent solution to porous ceramic particulate. For example, the infusion mixture 116 can include a chemical treatment agent solution via line 114 to porous ceramic proppant composition via line 112 weight ratio of about 1:50, about 1:25, about 1:20, about 1:15, or about 1:10 to about 1:8, about 1:6, about 1:5, about 1:4, about 1:3, about 1:2, or about 1:1. In one or more exemplary embodiments, the chemical treatment agent solution to porous ceramic proppant weight ratio is about 1:1 in the infusion mixture. The infusion mixture 116 can have a solids content of about 0.01 wt %, about 0.05 wt %, about 0.1 wt %, about 0.5 wt %, about 1 wt %, about 2 wt %, about 5 wt %, about 7 wt %, about 10 wt %, about 15 wt %, about 20 wt %, about 30 wt %, about 40 wt %, or about 45 wt % to about 55 wt %, about 60 wt %, about 65 wt %, about 70 wt %, or about 75 wt %. The infusion mixture 116 can have a chemical treatment agent content of about 0.1 wt %, about 0.5 wt %, about 1 wt %, about 3 wt %, about 5 wt %, or about 7 wt % to about 10 wt %, about 12 wt %, about 15 wt %, about 20 wt %, or about 25 wt %.

The infusion mixture 116 can have a liquid-gas interface 118 having any suitable height within the vessel 106. The liquid-gas interface 118 can be disposed at any height above the agitator 122 such that the agitator blades 126 are at least partially submerged below the liquid-gas interface 118. For example, the liquid-gas interface 118 can be disposed at any height above the agitator 122 such that the agitator blades 126 are completely submerged below the liquid-gas interface 118. The agitator 122 can rotate at any suitable rate. For example, the agitator 122 can rotate at a rate from about 1 revolutions per minute (rpm), about 5 rpm, about 10 rpm, about 15, about 20, about 25 rpm, or about 30 rpm to about 40 rpm, about 45 rpm, about 50 rpm, about 55 rpm, about 60 rpm, about 75 rpm, about 100 rpm, about 150 rpm, or about 300 rpm or more. The agitator 118 can rotate before, during, and/or after the introduction of the chemical treatment agent solution via line 114 and the porous ceramic proppant composition via line 112.

The porous ceramic proppant composition via line 112 and/or the chemical treatment agent solution via line 114 can be preheated to any suitable temperature prior to and/or upon entering the mixing vessel 106. The porous ceramic proppant composition via line 112 and/or the chemical treatment agent solution via line 114 can be preheated to a temperature from about 35° C., about 55° C., about 75° C., about 100° C., about 125° C., or about 150° C. to about 160° C., about 180° C., about 200° C., about 225° C., about 250° C., or about 500° C. or more prior to entering the mixing vessel 106. For example, the infusion mixture 116 can have a temperature from about 35° C., about 55° C., about 75° C., about 100° C., about 125° C., or about 150° C. to about 160° C., about 180° C., about 200° C., about 225° C., or about 250° C. or more prior to introduction of microwave energy to the mixing vessel 106. The infusion mixture 116 can also have a temperature from about 35° C., about 45° C., about 55° C., or about 65° C. to about 75° C., about 80° C., about 85° C., about 90° C., about 95° C., or about 100° C. or more prior to introduction of microwave energy to the mixing vessel 106.

The agitator 122 can mix the infusion mixture 116 for any suitable time prior to introduction of microwave energy. For example, the agitator 122 can mix or agitate the infusion mixture 116 for about 10 seconds, about 30 seconds, about 1 minute, about 2 minutes, about 4 minutes, or about 6 minutes to about 8 minutes, about 10 minutes, about 12 minutes, about 15 minutes, or about 20 minutes or more prior to introduction of any microwave energy to the mixing vessel 106.

The first and second microwave generators 102, 104 can introduce or emit microwave energy, or microwave radiation, to the infusion mixture 116 via first and second waveguides 108, 110, respectively. The microwave energy from the first and second microwave generators 102, 104 can be introduced to the infusion mixture 116 before, during, or after agitation of the infusion mixture 116. For example, the microwave energy from the first and second microwave generators 102, 104 can be introduced to the infusion mixture 116 during rotation of the agitator 122.

The first and second microwave generators 102, 104 can emit microwave energy in any suitable amounts. In one or more exemplary embodiments, the first and/or second microwave generators 102, 104 generate a power output of about 1 kW, about 2 kW, about 5 kW, about 10 kW, about 20 kW, about 30 kW, about 40 kW, or about 50 kW to about 65 kW, about 75 kW, about 85 kW, about 100 kW, or about 200 kW or more. The first and/or second microwave generators 102, 104 can also generate a power output of about 4 kW, about 8 kW, about 15 kW, about 25 kW, about 50 kW, about 80 kW, about 100 kW, or about 120 kW to about 150 kW, about 200 kW, about 250 kW, about 300 kW, or about 400 kW or more. In one or more exemplary embodiments, the first and/or second microwave generators 102, 104 can introduce about 5 kWh, about 10 kWh, about 15 kWh, about 25 kWh, or about 35 kWh to about 45 kWh, about 55 kWh, about 65 kWh, about 75 kWh, about 85 kWh, about 100 kWh, or about 200 kWh or more of microwave energy to the mixing vessel 106. The first and/or second microwave generators 102, 104 can also introduce about 10 kWh, about 25 kWh, about 50 kWh, about 75 kWh, or about 95 kWh to about 105 kWh, about 125 kWh, about 150 kWh, about 200 kWh, about 250 kWh, about 300 kWh, or about 400 kWh or more of microwave energy to the mixing vessel 106.

The first and second microwave generators 102, 104 can generate a temperature of at least about 30° C., at least about 35° C., at least about 40° C., at least about 50° C., at least about 60° C., at least about 70° C., at least about 80° C., at least about 90° C., at least about 95° C., or at least about 99° C. in the infusion mixture 116. For example, the first and second microwave generators 102, 104 can heat the infusion mixture 116 to a temperature from about 65° C., about 75° C., about 85° C., or about 95° C. to about 100° C., about 105° C., about 110° C., about 120° C., about 130° C., about 150° C., about 170° C., about 200° C., or about 225° C. or more. The microwave generators 102, 104 can achieve a heating rate of the infusion mixture 116 from about 1° C./min, about 2° C./min, about 5° C./min, about 7° C./min, or about 9° C./min to about 11° C./min, about 13° C./min, about 15° C./min, about 20° C./min, or about 25° C./min or more.

The infusion mixture 116 can have any suitable residence time in the mixing vessel 106. The infusion mixture 116 can have a residence time from about 1 minute, about 5 minutes, about 10 minutes, about 15 minutes, about 20 minutes, or about 25 minutes to about 30 minutes, about 35 minutes, about 45 minutes, about 1 hour, about 2 hours, about 4 hours, or about 8 hours or more in the mixing vessel 106. For example, the infusion mixture 116 can have a residence time from about 5 minutes to about 40 minutes, about 8 minutes to about 32 minutes, or about 12 minutes to about 25 minutes in the mixing vessel 106. The infusion mixture 116 can also be subjected to or exposed to microwave radiation for any suitable duration. The infusion mixture 116 can be exposed to microwave energy for about 10 seconds, about 30 seconds, about 1 minute, about 2 minutes, about 4 minutes, about 8 minutes, about 12 minutes, or about 18 minutes to about 25 minutes, about 30 minutes, about 45 minutes, about 1 hour, or about 2 hours or more in the mixing vessel 106. For example, the infusion mixture 116 can be exposed to microwave energy for about 45 seconds to about 18 minutes, about 1.5 minutes to about 12 minutes, about 2 minutes to about 7 minutes, about 15 minutes to about 25 minutes, about 25 minutes to about 55 minutes, or about 30 minutes to about 45 minutes in the mixing vessel 106.

The heating rate of the infusion mixture 116 by the microwave generators 102, 104 can be constant or varied. The infusion mixture 116 can be subjected to a single continuous emission of microwave energy. For example, the infusion mixture 116 can be subjected to a constant amount of microwave energy for a single continuous period of time until an infused ceramic product is obtained.

The infusion mixture 116 can be subjected to multiple emissions of microwave energy. The infusion mixture 116 can be subjected to two or more emissions of microwave energy under until an infused ceramic product is obtained. For example, the infusion mixture 116 can be sequentially subjected to two or more microwave energy emissions under sequential periods of time until an infused ceramic product is obtained. The two or more microwave energy emissions can be the same or different.

For example, the microwave generators 102, 104 can heat the infusion mixture 116 to a temperature below about 35° C., about 55° C., about 75° C., about 85° C., about 95° C., about 100° C., or about 125° C. for the first or initial 1%, 2%, 5%, 10%, 15%, 20%, 25%, 30%, 40%, 50%, 60%, 70%, 80%, 90%, or 95% of the total time that the infusion mixture 116 is exposed to microwave energy. The microwave generators 102, 104 can then heat the infusion mixture 116 to a temperature above about 35° C., about 55° C., about 75° C., about 85° C., about 95° C., about 100° C., or about 125° C. for the second, subsequent, or remaining 99%, 98%, 95%, 90%, 85%, 80%, 75%, 70%, 60%, 50%, 40%, 30%, 20%, 10%, or 5% of the total time that the infusion mixture 116 is exposed to microwave energy.

Infused ceramic proppant can be withdrawn from the mixing vessel 106 via line 128. The infused ceramic proppant via line 128 can contain a homogeneous or substantially homogeneous distribution of the chemical treatment agent throughout the pores and/or interstitial spaces thereof. The infused ceramic proppant via line 128 can have a chemical treatment agent concentration of about 0.01 wt %, about 0.05 wt %, about 0.1 wt %, about 0.5 wt %, about 1 wt %, about 2 wt %, about 4 wt %, about 6 wt %, about 10 wt %, about 15 wt %, or about 20 wt % to about 25 wt %, about 30 wt %, about 35 wt %, or about 40 wt % or more based on the total weight of the infused ceramic proppant via line 128. For example, the infused ceramic proppant via line 128 can have a chemical treatment agent concentration from about 0.01 wt % to about 1 wt %, 0.01 wt % to about 2 wt %, 0.01 wt % to about 5 wt %, 0.01 wt % to about 15 wt %, about 2.5 wt % to about 10 wt %, about 4.5 wt % to about 9 wt %, or about 5.5 wt % to about 8 wt %.

The infused ceramic proppant via line 128 can have a moisture content or water content of less than about 5 wt %, about 2 wt %, about 1 wt %, about 0.5 wt %, about 0.25 wt %, or about 0.1 wt % based on the total weight of the infused ceramic proppant via line 128. The infused ceramic proppant via line 128 can have a temperature of about 35° C., about 55° C., about 75° C., about 85° C., about 95° C., about 100° C., or about 125° C. to about 135° C., about 150° C., about 175° C., about 200° C., or about 225° C. or more. The infused ceramic proppant via line 128 can be introduced to a particulate cooler (not shown) to reduce the temperature of the infused ceramic proppant to about ambient temperature. In one or more exemplary embodiments, the infused ceramic proppant via line 128 can be introduced to the particulate cooler without being subjected to an intermediate drying step.

Figure 2:
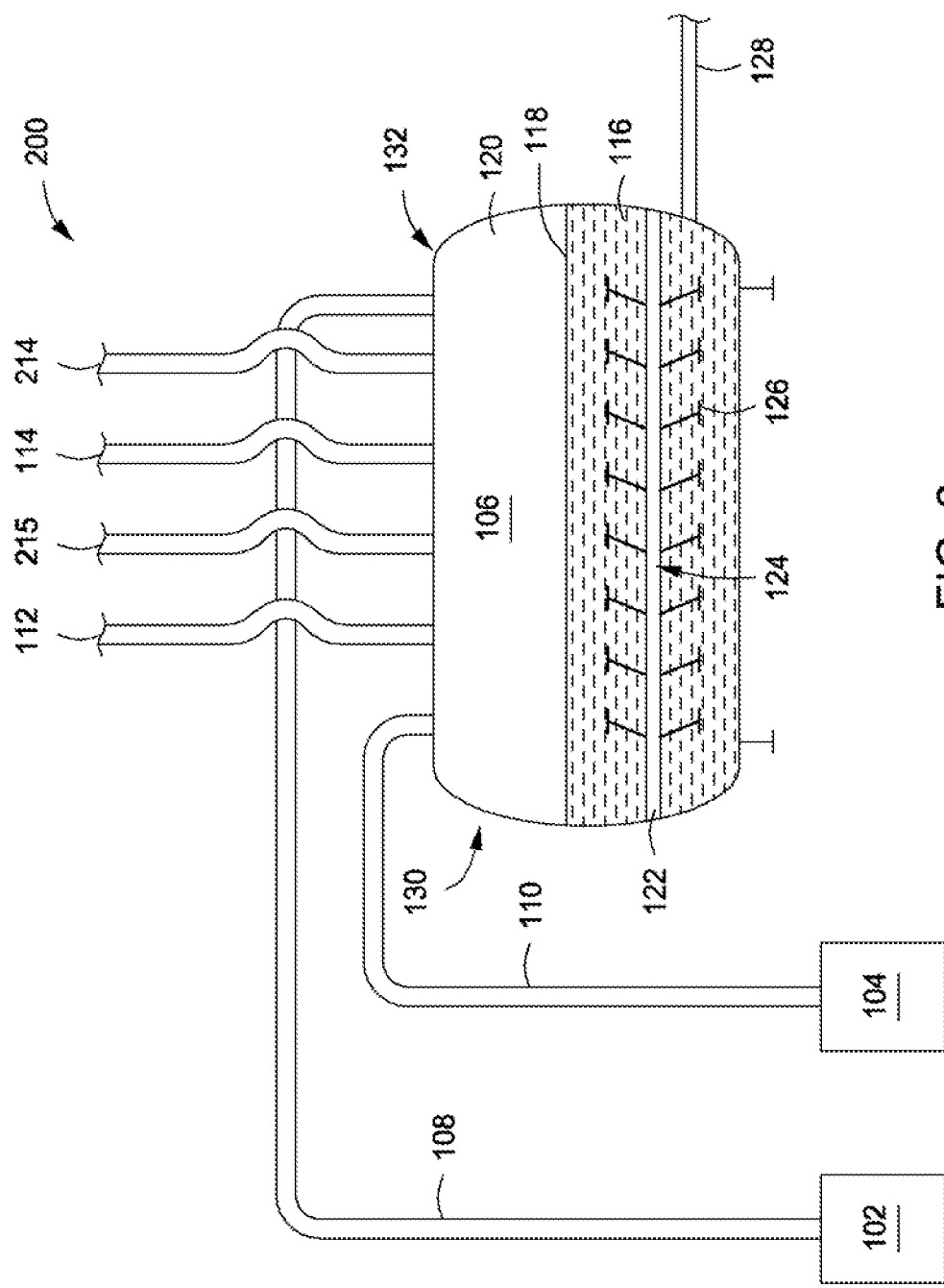
FIG. 2 is a schematic illustration of another system for infusing porous ceramic proppant with a chemical treatment agent, according to several exemplary embodiments of the present invention.

FIG. 2 is a schematic illustration of a system 200 for infusing porous ceramic particulates with a chemical treatment agent, according to several exemplary embodiments. The system 200 can include the system 100 with the addition of multiple chemical agent feed lines (three are shown). The system 200 can include any number of chemical agent feed lines. As shown in FIG. 2, the system 200 includes the one or more chemical treatment agent feed lines 114, or first chemical agent feed line 114, in addition to one or more second chemical treatment agent feed lines 214 and one or more third chemical treatment agent feed lines 215. The system 200 can also include the one or more first microwave generators 102, one or more second microwave generators 104, and one or more mixing vessels 106, as described above with reference to FIG. 1. In an alternative embodiment (not shown), the system 200 can include the first chemical agent feed line, the second chemical treatment agent feed line and the third chemical treatment agent feed line can be the same or a single feed line. For example, two or more chemical treatment agents, such as the first, second, and third chemical treatment agents, can be blended together prior to entering the mixing vessel 106.

Referring now to FIG. 2, in operation, a first chemical treatment agent can be mixed with a first carrier solution to provide a first chemical treatment agent solution. The first chemical treatment agent can be mixed with the first carrier solution before, after, or during introduction to the mixing vessel 106 and/or the first chemical agent feed line 114. For example, the first chemical treatment agent can be mixed with the first carrier solution before entering the first chemical agent feed line 114 in order that the first chemical treatment agent solution enters the mixing vessel 106 via line 114. A second chemical treatment agent can be mixed with a second carrier solution to provide a second chemical treatment agent solution. The second chemical treatment agent can be mixed with the second carrier solution before, after, or during introduction to the mixing vessel 106 and/or the second chemical agent feed line 214. For example, the second chemical treatment agent can be mixed with the second carrier solution before entering the second chemical agent feed line 214 in order that the second chemical treatment agent solution enters the mixing vessel 106 via line 214. A third chemical treatment agent can be mixed with a third carrier solution to provide a third chemical treatment agent solution. The third chemical treatment agent can be mixed with the third carrier solution before, after, or during introduction to the mixing vessel 106 and/or the third chemical agent feed line 215. For example, the third chemical treatment agent can be mixed with the third carrier solution before entering the third chemical agent feed line 215 in order that the third chemical treatment agent solution enters the mixing vessel 106 via line 215.

The first, second, and third chemical treatment agents introduced to the vessel 106 via lines 114, 214, and 215, respectively can include any element, compound, or composition suitable for providing some function that is useful for the production performance of a hydraulically fractured well. For example, first, second, and third chemical treatment agents can include any other chemical treatment agents described above. The first, second, or third carrier solution can be in the form of an aqueous phase solution or an organic phase solution. In one or more exemplary embodiments, the first, second, and third carrier solutions are aqueous phase solutions. In one or more exemplary embodiments, the first, second, and third carrier solutions are organic phase solutions. For example, the first, second, and third carrier solutions can each be or include the carrier solution as described above. For example, the first, second, and/or third carrier solutions carrier solution can be or include water in any amounts. The first, second, and/or third carrier solutions can include at least about 1 wt %, at least about 2 wt %, at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 65 wt %, at least about 75 wt %, at least about 85 wt %, at least about 90 wt %, at least about 95 wt %, at least about 99 wt %, at least about 99.9 wt %, or 100 wt % liquid water. The first, second, and/or third carrier solutions can be or include solvent and/or hydrocarbons in any amounts. The first, second, and/or third carrier solutions can include at least about 1 wt %, at least about 2 wt %, at least about 5 wt %, at least about 10 wt %, at least about 15 wt %, at least about 20 wt %, at least about 25 wt %, at least about 30 wt %, at least about 35 wt %, at least about 40 wt %, at least about 45 wt %, at least about 50 wt %, at least about 65 wt %, at least about 75 wt %, at least about 85 wt %, at least about 90 wt %, at least about 95 wt %, at least about 99 wt %, at least about 99.9 wt %, or 100 wt % liquid hydrocarbons. In one or more exemplary embodiments, the first chemical treatment agent is the first carrier solution, the second chemical treatment agent is the second carrier solution, and the third chemical treatment agent is the third carrier solution.

The porous ceramic proppant and the first, second, and/or third chemical treatment agent solutions can be added to the vessel 106 in any suitable amounts and mixed together in any suitable fashion to provide an infusion mixture 216 disposed within the vessel 106. The infusion mixture 216 can include any suitable ratio of first, second, and/or third chemical treatment agent solutions to porous ceramic particulate. For example, the infusion mixture 216 can include a first chemical treatment agent solution via line 114 to porous ceramic proppant composition via line 112 weight ratio of about 1:25, about 1:20, about 1:15, about 1:10, about 1:5, about 1:3, about 2:5, about 1:2, about 3:5, about 2:3, or about 4:5 to about 5:4, about 3:2, about 5:3, about 2:1, about 5:2, about 3:1, about 5:1, or about 10:1. The infusion mixture 216 can include a second chemical treatment agent solution via line 214 to porous ceramic proppant composition via line 112 weight ratio of about 1:10, about 1:5, about 1:3, about 2:5, about 1:2, about 3:5, about 2:3, or about 4:5 to about 5:4, about 3:2, about 5:3, about 2:1, about 5:2, about 3:1, about 5:1, or about 10:1. The infusion mixture 216 can include a third chemical treatment agent solution via line 215 to porous ceramic proppant composition via line 112 weight ratio of about 1:10, about 1:5, about 1:3, about 2:5, about 1:2, about 3:5, about 2:3, or about 4:5 to about 5:4, about 3:2, about 5:3, about 2:1, about 5:2, about 3:1, about 5:1, or about 10:1. In one or more exemplary embodiments, the first chemical treatment agent to porous ceramic proppant weight ratio can be about 0.1:1, about 0.2:1, about 0.5:1, 0.7:1, or about 1:1 in the infusion mixture 216. In one or more exemplary embodiments, the second chemical treatment agent to porous ceramic proppant weight ratio can be about 0.1:1, about 0.2:1, about 0.5:1, 0.7:1, or about 1:1 in the infusion mixture 216. In one or more exemplary embodiments, the third chemical treatment agent to porous ceramic proppant weight ratio can be about 0.1:1, about 0.2:1, about 0.5:1, 0.7:1, or about 1:1 in the infusion mixture 216. The infusion mixture 216 can have a solids content of about 0.01 wt %, about 0.05 wt %, about 0.1 wt %, about 0.5 wt %, about 1 wt %, about 2 wt %, about 5 wt %, about 7 wt %, about 10 wt %, about 15 wt %, about 20 wt %, about 30 wt %, about 40 wt %, or about 45 wt % to about 55 wt %, about 60 wt %, about 65 wt %, about 70 wt %, or about 75 wt %.

The mixing vessel 106 can mix, agitate, or stir, and heat the infusion mixture 216 under conditions similar to or the same as that of the infusion mixture 116 as described above. The infusion mixture 216 can have any suitable residence time in the mixing vessel 106 and he infusion mixture 216 can be formed by sequentially adding the first, second, and/or third chemical treatment agents to the mixing vessel 106 in any suitable sequence. For example, the first chemical treatment agent can be added to the mixing vessel 106 containing the porous ceramic proppant to produce a primary infusion mixture. The second chemical treatment agent can be added to the mixing vessel 106 containing the primary infusion mixture to produce a secondary infusion mixture. The third chemical treatment agent can be added to the mixing vessel 106 containing the secondary infusion mixture to produce a tertiary infusion mixture or infusion mixture 216.

The primary infusion mixture can have a residence time from about 1 minute, about 5 minutes, about 10 minutes, about 15 minutes, about 20 minutes, or about 25 minutes to about 30 minutes, about 35 minutes, about 45 minutes, about 1 hour, about 2 hours, about 4 hours, or about 8 hours or more in the mixing vessel 106. For example, the primary infusion mixture can have a residence time from about 5 minutes to about 40 minutes, about 8 minutes to about 32 minutes, or about 12 minutes to about 25 minutes in the mixing vessel 106. The primary infusion mixture can also be subjected to or exposed to microwave energy for any suitable duration. The primary infusion mixture can be exposed to microwave energy for about 10 seconds, about 30 seconds, about 1 minute, about 2 minutes, about 4 minutes, about 8 minutes, about 12 minutes, or about 18 minutes to about 25 minutes, about 30 minutes, about 45 minutes, about 1 hour, or about 2 hours or more in the mixing vessel 106 to produce a primary infused ceramic proppant. For example, the primary infusion mixture can be exposed to microwave energy for about 45 seconds to about 18 minutes, about 1.5 minutes to about 12 minutes, or about 2 minutes to about 7 minutes in the mixing vessel 106 to produce the primary infused ceramic proppant.

The secondary infusion mixture can have a residence time from about 1 minute, about 5 minutes, about 10 minutes, about 15 minutes, about 20 minutes, or about 25 minutes to about 30 minutes, about 35 minutes, about 45 minutes, about 1 hour, about 2 hours, about 4 hours, or about 8 hours or more in the mixing vessel 106. For example, the secondary infusion mixture can have a residence time from about 5 minutes to about 40 minutes, about 8 minutes to about 32 minutes, or about 12 minutes to about 25 minutes in the mixing vessel 106. The secondary infusion mixture can also be subjected to or exposed to microwave energy for any suitable duration. The secondary infusion mixture can be exposed to microwave energy for about 10 seconds, about 30 seconds, about 1 minute, about 2 minutes, about 4 minutes, about 8 minutes, about 12 minutes, or about 18 minutes to about 25 minutes, about 30 minutes, about 45 minutes, about 1 hour, or about 2 hours or more in the mixing vessel 106 to produce a secondary infused ceramic proppant. For example, the secondary infusion mixture can be exposed to microwave energy for about 45 seconds to about 18 minutes, about 1.5 minutes to about 12 minutes, or about 2 minutes to about 7 minutes in the mixing vessel 106 to produce the secondary infused ceramic proppant.

The tertiary infusion mixture or infusion mixture 216 can have a residence time from about 1 minute, about 5 minutes, about 10 minutes, about 15 minutes, about 20 minutes, or about 25 minutes to about 30 minutes, about 35 minutes, about 45 minutes, about 1 hour, about 2 hours, about 4 hours, or about 8 hours or more in the mixing vessel 106. For example, the infusion mixture 216 can have a residence time from about 5 minutes to about 40 minutes, about 8 minutes to about 32 minutes, or about 12 minutes to about 25 minutes in the mixing vessel 106. The infusion mixture 116 can also be subjected to or exposed to microwave energy for any suitable duration. The infusion mixture 216 can be exposed to microwave energy for about 10 seconds, about 30 seconds, about 1 minute, about 2 minutes, about 4 minutes, about 8 minutes, about 12 minutes, or about 18 minutes to about 25 minutes, about 30 minutes, about 45 minutes, about 1 hour, or about 2 hours or more in the mixing vessel 106 to produce a tertiary infused ceramic proppant or the infused ceramic proppant via line 228. For example, the infusion mixture 216 can be exposed to microwave energy for about 45 seconds to about 18 minutes, about 1.5 minutes to about 12 minutes, or about 2 minutes to about 7 minutes in the mixing vessel 106 to produce the tertiary infused ceramic proppant or the infused ceramic proppant via line 228.

The heating rate of the primary infusion mixture, the secondary infusion mixture, and/or the infusion mixture 216 by the microwave generators 102, 104 can be varied. For example, the microwave generators 102, 104 can heat the primary infusion mixture, the secondary infusion mixture, and/or the infusion mixture 216 to a temperature below about 35° C., about 55° C., about 75° C., about 85° C., about 95° C., about 100° C., or about 125° C. for the first or initial 30%, 40%, 50%, 60%, 70%, 80%, 90%, or 95% of the total time that the primary infusion mixture, the secondary infusion mixture, and/or the infusion mixture 216 is exposed to microwave energy. The microwave generators 102, 104 can then heat the primary infusion mixture, the secondary infusion mixture, and/or the infusion mixture 216 to a temperature above about 35° C., about 55° C., about 75° C., about 85° C., about 95° C., about 100° C., or about 125° C. for the second, subsequent, or remaining 70%, 60%, 50%, 40%, 30%, 20%, 10%, or 5% of the total time that the primary infusion mixture, the secondary infusion mixture, and/or the infusion mixture 216 is exposed to microwave energy.

Infused ceramic proppant can be withdrawn from the mixing vessel 106 of system 200 via line 228. The infused ceramic proppant via line 228 can contain a homogeneous or substantially homogeneous distribution of the first, second, and/or third chemical treatment agents throughout the pores and/or interstitial spaces thereof. In an embodiment (not shown), the infused ceramic proppant via line 228 can contain a homogeneous or substantially homogeneous distribution of four or more distinct chemical treatment agents throughout the pores and/or interstitial spaces thereof. The infused ceramic proppant via line 228 can have a first chemical treatment agent concentration of about 0.01 wt %, about 0.05 wt %, about 0.1 wt %, about 0.5 wt %, about 1 wt %, about 2 wt %, about 4 wt %, or about 6 wt % to about 8 wt %, about 10 wt %, or about 12 wt % or more based on the total weight of the infused ceramic proppant via line 228. The infused ceramic proppant via line 228 can have a second chemical treatment agent concentration of about 0.01 wt %, about 0.05 wt %, about 0.1 wt %, about 0.5 wt %, about 1 wt %, about 2 wt %, about 4 wt %, or about 6 wt % to about 8 wt %, about 10 wt %, or about 12 wt % or more based on the total weight of the infused ceramic proppant via line 228. The infused ceramic proppant via line 228 can have a third chemical treatment agent concentration of about 0.01 wt %, about 0.05 wt %, about 0.1 wt %, about 0.5 wt %, about 1 wt %, about 2 wt %, about 4 wt %, or about 6 wt % to about 8 wt %, about 10 wt %, or about 12 wt % or more based on the total weight of the infused ceramic proppant via line 228.

The chemical treatment agents can also be non-homogeneously infused in to the ceramic proppant. For example, one or more areas of zones of the ceramic proppant can be targeted for infusion of the one or more chemical treatment agents. In one or more exemplary embodiments, the infused ceramic proppant via line 228 can contain a layered or core-shell type distribution of the first, second, and/or third chemical treatment agents throughout the pores and/or interstitial spaces thereof. For example, the first chemical treatment agent can be infused throughout the pores and/or interstitial spaces of a zone at or near a center or core of the ceramic proppant. The third chemical treatment agent can be infused throughout the pores and/or interstitial spaces of an outermost zone of the ceramic proppant and the second chemical treatment agent can be infused throughout the pores and/or interstitial spaces of a zone between the core and the outermost portion of the ceramic proppant.

The infused ceramic proppant via line 228 can have a moisture content or water content of less than about 5 wt %, about 2 wt %, about 1 wt %, about 0.5 wt %, about 0.25 wt %, or about 0.1 wt % based on the total weight of the infused ceramic proppant via line 228. The infused ceramic proppant via line 228 can have a temperature of about 35° C., about 55° C., about 75° C., about 85° C., about 95° C., about 100° C., or about 125° C. to about 135° C., about 150° C., about 175° C., about 200° C., or about 225° C. or more. The infused ceramic proppant via line 228 can be introduced to a particulate cooler (not shown) to reduce the temperature of the infused ceramic proppant to about ambient temperature. In one or more exemplary embodiments, the infused ceramic proppant via line 228 can be introduced to the particulate cooler without being subjected to an intermediate drying step.

In one or more exemplary embodiments (not shown), the first and second microwave generators 102, 104 of FIGS. 1 and 2 can be replaced by or supplemented with one or more heaters. The one or more heaters can be or include one or more direct gas-fired heaters, one or more indirect gas-fired heaters, one or more electric heaters, one or more electric arc furnaces, one or more forced air heaters, one or more radiant heaters, one or more infrared heaters, or one or more heat exchangers having coiled tubing containing hot, circulating mineral oil.

In operation, the chemical treatment agent can be mixed with the carrier solution to provide the chemical treatment agent solution, as described herein with reference to FIG. 1. The chemical treatment agent solution can then be mixed with the porous ceramic proppant in the mixing vessel 106 to produce the infusion mixture 116. The infusion mixture 116 can be subjected to thermal energy produced by the heaters.

The carrier solution and/or the first, second, and/or third carrier solutions can include any carrier or carrier solution disclosed above having a solid form or solid phase. The carrier solutions can be a solid at ambient conditions or room temperature. For example, the carrier solutions can be introduced to the mixing vessel in the form of a solid. The solid phase carrier solutions can be or include one or more waxes, paraffins, polymeric compositions, or other non-metallic solids that can be melted and infused into the pores and interstitial spaces of ceramic proppant. The carrier solution can be or include the paraffin and asphaltene inhibitors described herein. For example, the carrier solution can be or include ethylene/vinyl acetate copolymers, acrylates (such as polyacrylate esters and methacrylate esters of fatty alcohols), and olefin/maleic esters, fatty ester homopolymers and copolymers (such as fatty esters of acrylic and methacrylic acid polymers and copolymers) and sorbitan monooleate. For example, the chemical treatment agent is the carrier solution. The thermal energy produced by the heaters can melt or soften the solid phase carrier solution(s) to a viscosity sufficient to enter the pores and interstitial spaces of porous ceramic proppant via capillary pressure.

The heaters can generate a temperature of at least about 30° C., at least about 35° C., at least about 40° C., at least about 50° C., at least about 60° C., at least about 70° C., at least about 80° C., at least about 90° C., at least about 95° C., or at least about 99° C. in the infusion mixture 116. For example, the heaters can heat the infusion mixture 116 to a temperature from about 65° C., about 75° C., about 85° C., or about 95° C. to about 100° C., about 105° C., about 110° C., about 120° C., about 130° C., about 150° C., about 170° C., about 200° C., or about 225° C. or more. The heaters can achieve a heating rate of the infusion mixture 116 from about 1° C./min, about 2° C./min, about 5° C./min, about 7° C./min, or about 9° C./min to about 11° C./min, about 13° C./min, about 15° C./min, about 20° C./min, or about 25° C./min or more.

In one or more exemplary embodiments, the first, second, and/or third chemical treatment agents can be mixed with the first, second, and/or third carrier solution, respectively, to provide the first, second, and/or third chemical treatment agent solutions, as described herein with reference to FIG. 2. The first, second, and/or third chemical treatment agent solutions can then be mixed with the porous ceramic proppant in the mixing vessel 106 to produce the primary infusion mixture, the secondary infusion mixture, the tertiary infusion mixture, and/or infusion mixture 216. The primary infusion mixture, the secondary infusion mixture, the tertiary infusion mixture, and/or infusion mixture 216 can be subjected to the thermal energy produced by the heaters.

The heaters can generate a temperature of at least about 30° C., at least about 35° C., at least about 40° C., at least about 50° C., at least about 60° C., at least about 70° C., at least about 80° C., at least about 90° C., at least about 95° C., or at least about 99° C. in the primary infusion mixture, the secondary infusion mixture, the tertiary infusion mixture, and/or the infusion mixture 216. For example, the heaters can heat the primary infusion mixture, the secondary infusion mixture, the tertiary infusion mixture, and/or the infusion mixture 216 to a temperature from about 65° C., about 75° C., about 85° C., or about 95° C. to about 100° C., about 105° C., about 110° C., about 120° C., about 130° C., about 150° C., about 170° C., about 200° C., or about 225° C. or more. The heaters can achieve a heating rate of the primary infusion mixture, the secondary infusion mixture, the tertiary infusion mixture, and/or the infusion mixture 216 from about 1° C./min, about 2° C./min, about 5° C./min, about 7° C./min, or about 9° C./min to about 11° C./min, about 13° C./min, about 15° C./min, about 20° C./min, or about 25° C./min or more.

The infusion mixture 116 with reference to FIG. 1 and the primary infusion mixture, the secondary infusion mixture, the tertiary infusion mixture, and/or infusion mixture 216 with reference to FIG. 2 can have a residence time from about 1 minute, about 5 minutes, about 10 minutes, about 15 minutes, about 20 minutes, or about 25 minutes to about 30 minutes, about 35 minutes, about 45 minutes, about 1 hour, about 2 hours, about 4 hours, or about 8 hours or more in the mixing vessel. For example, the infusion mixture, the primary infusion mixture, the secondary infusion mixture, and/or the tertiary infusion mixture can have a residence time from about 5 minutes to about 40 minutes, about 8 minutes to about 32 minutes, or about 12 minutes to about 25 minutes in the mixing vessel. The infusion mixture, the primary infusion mixture, the secondary infusion mixture, and/or the tertiary infusion mixture can also be subjected to or exposed to thermal energy for any suitable duration. The infusion mixture, the primary infusion mixture, the secondary infusion mixture, and/or the tertiary infusion mixture can be exposed to thermal energy for about 10 seconds, about 30 seconds, about 1 minute, about 2 minutes, about 4 minutes, about 8 minutes, about 12 minutes, or about 18 minutes to about 25 minutes, about 30 minutes, about 45 minutes, about 1 hour, or about 2 hours or more in the mixing vessel to produce the infused ceramic proppant, the primary infused ceramic proppant, the secondary infused ceramic proppant, and/or the tertiary infused ceramic proppant, respectively. For example, the infusion mixture, the primary infusion mixture, the secondary infusion mixture, and/or the tertiary infusion mixture can be exposed to thermal energy for about 45 seconds to about 18 minutes, about 1.5 minutes to about 12 minutes, or about 2 minutes to about 7 minutes in the mixing vessel 106 to produce the infused ceramic proppant, the primary infused ceramic proppant, the secondary infused ceramic proppant, and/or the tertiary infused ceramic proppant, respectively.

The infused ceramic proppant can contain the one or more chemical treatment agents distributed homogenously throughout the porous ceramic proppant substrate. For example, the infused ceramic proppant can include a substantially uniform concentration of chemical treatment agents along a cross-sectional area of the infused ceramic proppant.

Figure 3:
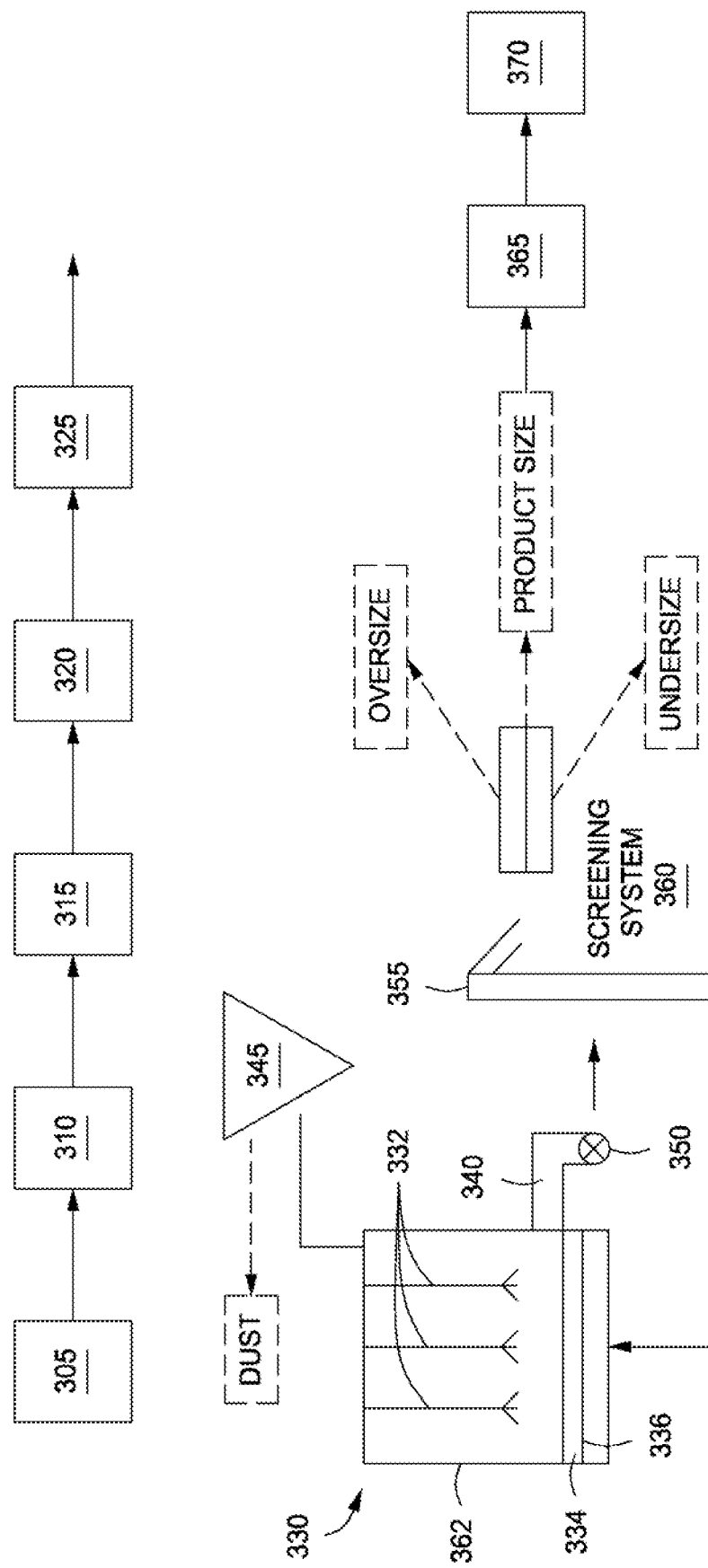
FIG. 3 is a schematic illustration of a system for preparing porous ceramic proppant infused with a chemical treatment agent, according to several exemplary embodiments of the present invention.

FIG. 3 is a schematic illustration of a system for preparing porous ceramic proppant infused with a chemical treatment agent, according to several exemplary embodiments of the present invention. The exemplary system illustrated in FIG. 3 can have a similar configuration and operation to that described in U.S. Pat. No. 4,440,866, the entire disclosure of which is incorporated herein by reference. The operations performed by the exemplary system illustrated in FIG. 3 can also be used to make the particles according to a batch process.

In the system illustrated in FIG. 3, an alumina-containing raw material having an alumina content of from about 10 wt % to about 90 wt %, from about 25 wt % to about 75 wt %, from about 35 wt % to about 65 wt %, from about 40 wt % to about 55 wt %, or from about 45 wt % to about 50 wt % (on a calcined basis) is passed through a shredder 105 which slices and breaks apart the raw material into small chunks. In some embodiments, when the raw material as mined, or as received, (referred to herein as "untreated" raw material) is of such consistency that it can be processed as described herein without shredding, the shredder can be bypassed. Raw material fed through a shredder such as is illustrated in FIG. 3, is referred to as "treated" raw material.

In several exemplary embodiments, the shredder breaks apart and slices the alumina-containing raw material so as to yield pieces having a diameter of less than about 10 inches, less than about 7 inches, less than about 5 inches, less than about 3 inches, or less than about 1 inch, although pieces having smaller and larger diameters can be further processed into a slurry as described herein. Shredders and numerous other devices for slicing, chopping or comminuting the alumina-containing raw material, as well as commercial sources for same, such as the Gleason Foundry Company, are well known to those of ordinary skill in the art.

The treated or untreated alumina-containing raw material and water can be fed to a blunger 310, which has a rotating blade that imparts a shear force to and further reduces the particle size of the raw material to form a slurry. In a continuous process, the raw material and water are continuously fed to the blunger. Blungers and similar devices for making slurries of such materials, as well as commercial sources for same are well known to those of ordinary skill in the art.

A sufficient amount of water can be added to the blunger 310 to result in a slurry having a solids content in the range of from about 10%, about 20%, about 40%, or about 50% to about 55%, about 60%, about 70%, or about 85% by weight. According to several exemplary embodiments, a sufficient amount of water is added to the slurry such that the solids content of the slurry is from about 45% to about 55%, about 45% to about 50%, or about 50% to about 65% by weight. According to several exemplary embodiments, a sufficient amount of water is added to the slurry such that the solids content of the slurry is about 50% by weight. The water added to the blunger 310 can be fresh water or deionized water. In a continuous process for preparing the slurry, the solids content of the slurry is periodically analyzed and the amount of water fed to the slurry adjusted to maintain the desired solids content. Methods for analyzing the solids content of a slurry and adjusting a feed of water are well known and understood by those of ordinary skill in the art.

According to several exemplary embodiments, a dispersant is added to the slurry in the blunger 310 to adjust the viscosity of the slurry to a target range as discussed further below. In several exemplary embodiments, the viscosity of the slurry in the blunger 310 is adjusted to the target range by the addition of a dispersant and a pH-adjusting reagent.

A dispersant can be added to the slurry prior to the addition of other additives. According to several exemplary embodiments, the composition includes a dispersant in an amount of from about 0.05%, about 0.10%, about 0.15%, or about 0.20% to about 0.25%, about 0.30%, about 0.35%, or about 0.45% by weight based on the dry weight of the alumina-containing raw material.

Exemplary materials suitable for use as a dispersant in the compositions and methods described herein include but are not limited to sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, and polyelectrolytes such as a composition of ammonium polymethacrylate and water commercially available from a variety of sources, such as, Kemira Chemicals under the trade name C-211, Phoenix Chemicals, Bulk Chemical Systems under the trade name BCS 4020 and R.T. Vanderbilt Company, Inc. under the trade name DARVAN C. Generally, the dispersant can be any material that will adjust the viscosity of the slurry to a target viscosity such that the slurry can be subsequently processed through one or more pressure nozzles of a fluidizer. In several exemplary embodiments, the target viscosity is less than 150 cP (as determined on a Brookfield Viscometer with a #61 spindle). According to several exemplary embodiments, the target viscosity is less than 125 cP, less than 100 cP, less than 80 cP, less than 70 cP, less than 60 cP, less than 50 cP, less than 40 cP, less than 30 cP, or less than 20 cP.

According to several exemplary embodiments in which a pH-adjusting reagent is used, a sufficient amount of a pH-adjusting reagent is added to the slurry to adjust the pH of the slurry to a range of from about 8 to about 11. In several exemplary embodiments, a sufficient amount of the pH-adjusting reagent is added to the slurry to adjust the pH to about 9, about 9.5, about 10 or about 10.5. The pH of the slurry can be periodically analyzed by a pH meter, and the amount of pH-adjusting reagent fed to the slurry adjusted to maintain a desired pH. Methods for analyzing the pH of a slurry and adjusting the feed of the pH-adjusting reagent are within the ability of those of ordinary skill in the art. Exemplary materials suitable for use as a pH-adjusting reagent in the compositions and methods described herein include but are not limited to ammonia and sodium carbonate.

Generally, the target viscosity of the compositions is a viscosity that can be processed through a given type and size of pressure nozzle in a fluidizer, without becoming clogged. Generally, the lower the viscosity of the slurry, the more easily it can be processed through a given fluidizer. However, the addition of too much dispersant can cause the viscosity of the slurry to increase to a point that it cannot be satisfactorily processed through a given fluidizer. One of ordinary skill in the art can determine the target viscosity for given fluidizer types through routine experimentation.

The blunger 310 mixes the alumina-containing raw material, water, dispersant and pH-adjusting reagent until a slurry is formed. The length of time required to form a slurry is dependent on factors such as the size of the blunger, the speed at which the blunger is operating, and the amount of material in the blunger.

From the blunger 310, the slurry is fed to a tank 315, where the slurry is continuously stirred, and a binder is added in an amount of from about 0.01%, about 0.05%, about 0.1%, about 0.2%, about 0.5%, about 1.0%, or about 2.0% to about 3.0%, about 5.0%, about 7.0%, about 10.0%, about 12.0%, about 15.0%, or about 20.0% by weight, based on the total dry weight of the alumina-containing raw material. In several exemplary embodiments, the binder is added in an amount of from about 0.2% to about 3.0%, about 0.7% to about 2.5%, or about 1.5% to about 2.0% by weight based on the total dry weight of the alumina-containing raw material. Suitable binders include but are not limited to polyvinyl acetate, polyvinyl alcohol (PVA), methylcellulose, dextrin and molasses. In several exemplary embodiments, the binder is PVA having a molecular weight of from about 1,000 Mn, about 5,000 Mn, about 10,000 Mn, about 20,000 Mn, or about 40,000 Mn to about 60,000 Mn, about 80,000 Mn, about 100,000 Mn, about 120,000 Mn, or about 200,000 Mn. "Mn" represents the number average molecular weight which is the total weight of the polymeric molecules in a sample, divided by the total number of polymeric molecules in that sample.

The tank 315 maintains the slurry created by the blunger 310. However, the tank 315 can stir the slurry with less agitation than the blunger, so as to mix the binder with the slurry without causing excessive foaming of the slurry or increasing the viscosity of the slurry to an extent that would prevent the slurry from being fed through the pressurized nozzles of a fluidizer.

According to several exemplary embodiments, the binder can be added to the slurry while in the blunger 310. According to such embodiments, the blunger 310 optionally has variable speeds, including a high speed to achieve the high intensity mixing for breaking down the raw material into a slurry form, and a low speed to mix the binder with the slurry without causing the above-mentioned excessive foaming or increase in viscosity.

Referring again to the tank 315 illustrated in FIG. 3, the slurry is stirred in the tank, after addition of the binder, for a time sufficient to thoroughly mix the binder with the slurry. In several exemplary embodiments, the slurry is stirred in the tank 315 for up to about 30 minutes following the addition of binder. In several exemplary embodiments, the slurry is stirred in the tank 315 for at least about 30 minutes. In several exemplary embodiments, the slurry is stirred in the tank 315 for more than about 30 minutes after addition of the binder.

Tank 315 can also be a tank system comprised of one, two, three or more tanks. Any configuration or number of tanks that enables the thorough mixing of the binder with the slurry is sufficient. In a continuous process, water, and one or more of dust, oversize particles, or undersize particles from a subsequent fluidizer or other apparatus can be added to the slurry in the tank 315.

From the tank 315, the slurry is fed to a heat exchanger 320, which heats the slurry to a temperature of from about 5° C., about 10° C., about 15° C., about 25° C., about 35° C., or about 50° C. to about 65° C., about 75° C., about 90° C., about 95° C., about 99° C., or about 105° C. From the heat exchanger 320, the slurry is fed to a pump system 125, which feeds the slurry, under pressure, to a fluidizer 330.

A grinding mill(s) and/or a screening system(s) (not illustrated) can be inserted at one or more places in the system illustrated in FIG. 3 prior to feeding the slurry to the fluidizer to assist in breaking any larger-sized alumina-containing raw material down to a target size suitable for feeding to the fluidizer. In several exemplary embodiments, the target size is less than 230 mesh. In several exemplary embodiments, the target size is less than 325 mesh, less than 270 mesh, less than 200 mesh or less than 170 mesh. The target size is influenced by the ability of the type and/or size of the pressure nozzle in the subsequent fluidizer to atomize the slurry without becoming clogged.

If a grinding system is employed, it is charged with a grinding media suitable to assist in breaking the raw material down to a target size suitable for subsequent feeding through one or more pressure nozzles of a fluidizer. If a screening system is employed, the screening system is designed to remove particles larger than the target size from the slurry. For example, the screening system can include one or more screens, which are selected and positioned so as to screen the slurry to particles that are smaller than the target size.

Referring again to FIG. 3, fluidizer 330 is of conventional design, such as described in, for example, U.S. Pat. No. 3,533,829 and U.K. Patent No. 1,401,303. Fluidizer 330 includes at least one atomizing nozzle 332 (three atomizing nozzles 332 being shown in FIG. 3), which is a pressure nozzle of conventional design. In other embodiments, one or more two-fluid nozzles are suitable. The design of such nozzles is well known, for example from K. Masters: "Spray Drying Handbook", John Wiley and Sons, New York (1979).

Fluidizer 330 further includes a particle bed 334, which can be supported by a plate 336, such as a perforated, straight or directional plate. Hot air flows through the plate 336. The particle bed 334 comprises seeds from which green pellets of a target size can be grown. The term "green pellets" and related forms, as used herein, refers to substantially round and spherical particles which have been formed from the slurry but are not sintered. When a perforated or straight plate is used, the seeds also serve to obtain plug flow in the fluidizer. Plug flow is a term known to those of ordinary skill in the art, and can generally be described as a flow pattern where very little back mixing occurs. The seed particles are smaller than the target size for green pellets made according to the present methods. In several exemplary embodiments, the seed comprises from about 5% to about 20% of the total volume of a green pellet formed therefrom. The slurry is sprayed, under pressure, through the atomizing nozzles 332, and the slurry spray coats the seeds to form green pellets that are substantially round and spherical.

External seeds can be placed on the perforated plate 336 before atomization of the slurry by the fluidizer begins. If external seeds are used, the seeds can be prepared in a slurry process similar to that illustrated in FIG. 3, where the seeds are simply taken from the fluidizer at a target seed size. External seeds can also be prepared in a high intensity mixing process such as that described in U.S. Pat. No. 4,879,181, the entire disclosure of which is hereby incorporated by reference.

According to several exemplary embodiments, external seeds are made from either a raw material having at least the same alumina content as the raw material used to make the slurry, or from a raw material having more or less alumina than the raw material used to make the slurry. In several exemplary embodiments, the slurry has an alumina content that is at least 10%, at least 20%, or at least 30% less than that of the seeds. In several exemplary embodiments, the external seeds have an alumina content less than that of the slurry, such as at least 10%, at least 20%, or at least 30% less than that of the slurry.

Alternatively, seeds for the particle bed are formed by the atomization of the slurry, thereby providing a method by which the slurry "self-germinates" with its own seed. According to several exemplary embodiments, the slurry is fed through the fluidizer 330 in the absence of a seeded particle bed 334. The slurry droplets exiting the nozzles 332 solidify, but are small enough initially that they get carried out of the fluidizer 330 by air flow and caught as "dust" (fine particles) by a dust collector 345, which can, for instance, be an electrostatic precipitator, a cyclone, a bag filter, a wet scrubber or a combination thereof. The dust from the dust collector is then fed to the particle bed 334 through dust inlet 362, where it is sprayed with slurry exiting the nozzles 332. The dust particles can be recycled a sufficient number of times, until they have grown to a point where they are too large to be carried out by the air flow and can serve as seeds. The dust particles can also be recycled to another operation in the process, for example, the tank 315.

Referring again to FIG. 3, hot air is introduced to the fluidizer 330 by means of a fan and an air heater, which are schematically represented at 338. The velocity of the hot air passing through the particle bed 334 can be from about 0.1 meters/second, about 0.5 meters/second, or about 0.9 meters/second to about 1.2 meters/second, about 1.5 meters/second, or about 2.0 meters/second, and the depth of the particle bed 334 can be from about 1 centimeter, about 2 centimeters, about 5 centimeters, about 10 centimeters, or about 20 centimeters to about 30 centimeters, about 40 centimeters, about 60 centimeters, about 80 centimeters, or about 100 centimeters. The temperature of the hot air when introduced to the fluidizer 330 can be from about 100° C., about 150° C., about 200° C., or about 250° C. to about 300° C., about 400° C., about 500° C., about 600° C., about 650° C., or about 1,000° C. The temperature of the hot air as it exits from the fluidizer 330 can be less than about 250° C., less than about 200° C., or less than about 150° C., and in several exemplary embodiments is less than about 100° C.

The distance between the atomizing nozzles 332 and the plate 336 is optimized to avoid the formation of dust which occurs when the nozzles 332 are too far away from the plate 326 and the formation of irregular, coarse particles which occurs when the nozzles 332 are too close to the plate 336. The position of the nozzles 332 with respect to the plate 336 is adjusted on the basis of an analysis of powder sampled from the fluidizer 330.

The green pellets formed by the fluidizer accumulate in the particle bed 334. In a continuous process, the green pellets formed by the fluidizer 330 are withdrawn through an outlet 340 in response to the level of product in the particle bed 334 in the fluidizer 330, so as to maintain a given depth in the particle bed. A rotary valve 350 conducts green pellets withdrawn from the fluidizer 330 to an elevator 355, which feeds the green pellets to a screening system 360, where the green pellets are separated into one or more fractions, for example, an oversize fraction, a product fraction, and an undersized fraction.

The oversize fraction exiting the screening unit 360 includes those green pellets that are larger than the desired product size. In a continuous process, the oversize green pellets can be recycled to tank 315, where at least some of the oversize green pellets can be broken down and blended with slurry in the tank. Alternatively, oversize green pellets can be broken down and recycled to the particle bed 334 in the fluidizer 330. The undersize fraction exiting the screening system 360 includes those green pellets that are smaller than the desired product size. In a continuous process, these green pellets can be recycled to the fluidizer 330, where they can be fed through an inlet 362 as seeds or as a secondary feed to the fluidizer 330.

The product fraction exiting the screening system 360 includes those green pellets having the desired product size. The size limits for the product fractions exiting the screening system 360 are fixed with due regard to the fact that in the subsequent sintering process, substantial shrinkage of the green pellets can occur depending upon the starting materials from which the green pellets are made. The green pellets exiting the screening system 360 can be sent to a pre-sintering device 365, for example, a calciner, where the green pellets are dried or calcined prior to sintering. In several exemplary embodiments, the green pellets are dried in the pre-sintering device 365 to a moisture content of less than about 25% by weight, less than about 18% by weight, less than about 15% by weight, less than about 12% by weight, less than about 10% by weight, less than about 5% by weight, or less than about 1% by weight. The pre-sintering device 365 can be or include any suitable device for removing moisture from the green pellets. In an exemplary embodiment, the pre-sintering device 365 can include a calciner. The calciner can be or include one or more direct and/or indirect fired rotary kilns.

In several exemplary embodiments, after drying and/or calcining, the green pellets are fed to a sintering device 370, in which the green pellets are sintered for a period of time and at a temperature sufficient to enable recovery of porous ceramic proppant, such as the porous ceramic proppant disclosed herein. The sintering device 370 can include a gas-fired rotary kiln and/or a microwave furnace.

The sintering device 370 can heat the green pellets to a temperature of about 200° C., about 350° C., about 500° C., about 650° C., or about 800° C. to about 1,000° C., about 1,200° C., about 1,350° C., about 1,400° C., or about 1,550° C. or more. In an exemplary embodiment, the green pellets can be heated to a maximum temperature of less than 1,600° C., less than 1,500° C., less than 1,400° C., or less than 1,300° C. The green pellets can be heated to a peak temperature of from about 1,150° C., about 1,250° C., or about 1,300° C. to about 1,350° C., about 1,400° C., or about 1,450° C. and the green pellets are sintered at the peak temperature for a cycle time of from about 5, about 10, about 15 to about 20, about 30, about 40, about 45, or about 60 minutes or more in the sintering device 370. The porous ceramic proppant can be withdrawn from sintering device 370 and introduced, either indirectly or directly, to the mixing vessel 106 as described above with reference to FIGS. 1 and/or 2.

According to several exemplary embodiments described herein, the infused, porous ceramic proppants disclosed herein are made in a continuous process, while in several other exemplary embodiments, the infused, porous ceramic proppants disclosed herein are made in a batch process.

Figure 4:
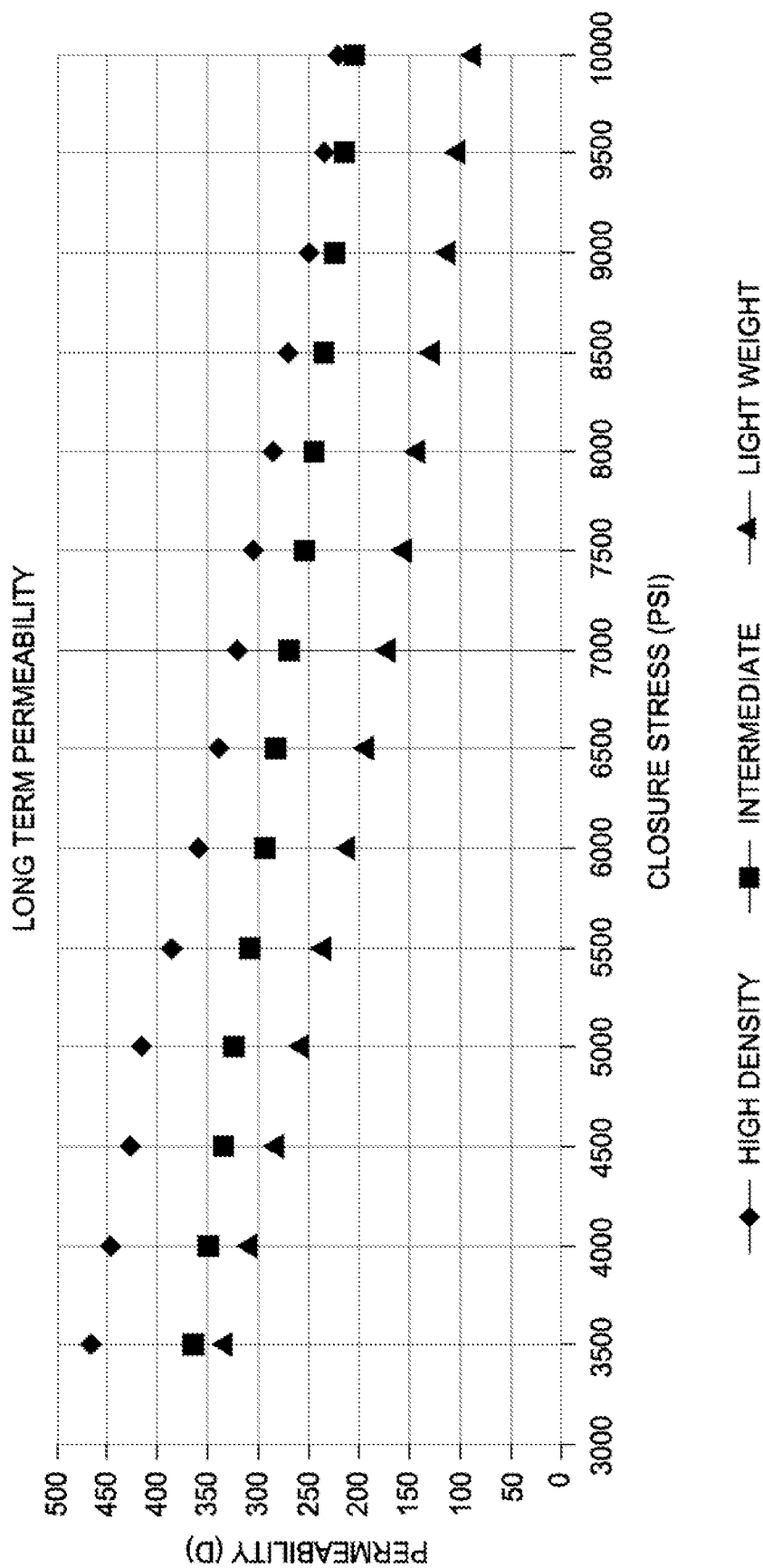
FIG. 4 is a graphical representation of the permeability of light weight ceramic proppant, intermediate density ceramic proppant, and high density ceramic proppant.
Figure 5:
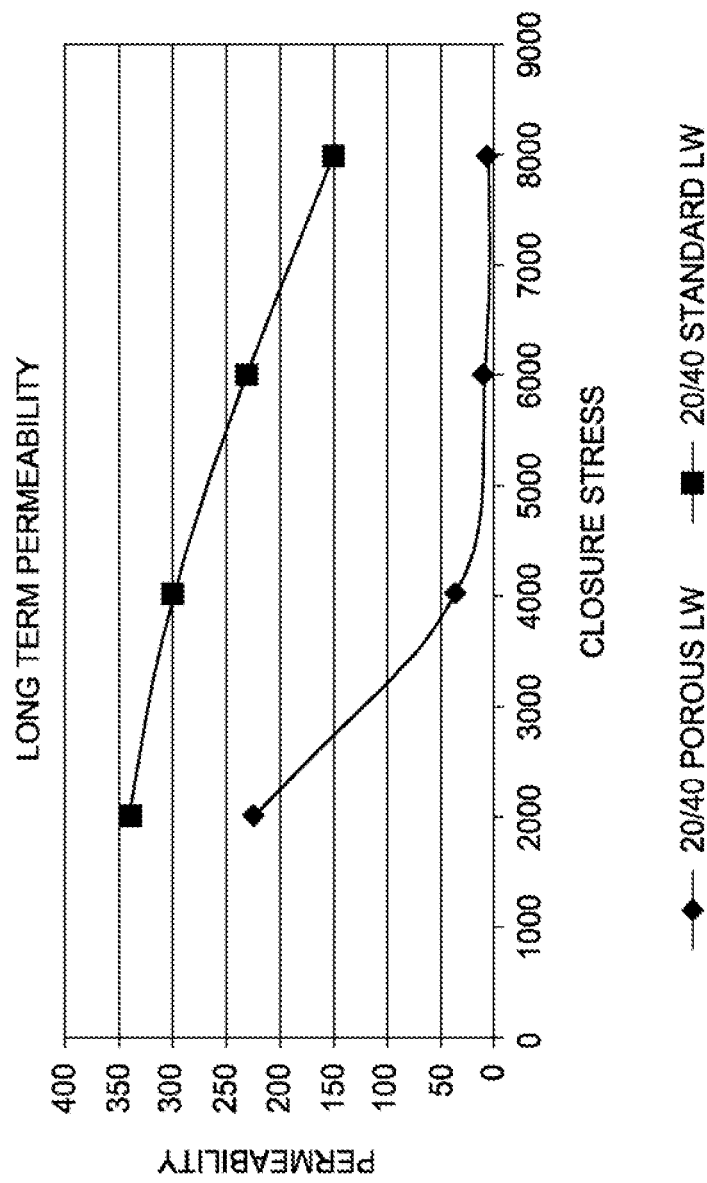
FIG. 5 is a graphical representation of the long term permeability of a standard non-porous light weight ceramic proppant and a light weight porous ceramic proppant (at 25% porosity).

FIG. 4 is a graphical comparison of the permeability of light weight ceramic proppant, intermediate density ceramic proppant, and high density ceramic proppant. As shown in FIG. 4, a high density ceramic proppant has a higher permeability than an intermediate density ceramic proppant which in turn has a higher permeability than a light weight ceramic proppant. This variability results from the crystalline structure differences arising from the difference in composition of the starting raw materials. FIG. 5 is a graphical representation of the long term permeability of a standard non-porous light weight ceramic proppant and a light weight porous ceramic proppant (at 25% porosity). Standard ceramic proppants are generally manufactured so as to eliminate as much porosity as is practically possible in the individual particulates in order to maximize the inherent strength of the particles. This is consistent with the nature of ceramic bodies in that they tend to fail as a function of the size of the largest internal flaw and in this context an internal open pore space is a flaw. Consequently, in a general sense, the lower the internal porosity with small pore sizes, the stronger the ceramic body. Conversely, in a general sense, the greater the overall amount of internal porosity and large pore size of a ceramic particulate the weaker will be its inherent strength. Thus, the conductivity of a light weight ceramic proppant in which there is 10% porosity in the particle will be lower than the conductivity of a lightweight ceramic proppant having 5% porosity which in turn will be lower than a non-porous light weight ceramic proppant.

Further, the comparison shown in FIG. 4 for non-porous ceramic particulates can be duplicated for porous ceramic particulates or porous ceramic proppant. Specifically, a high density porous ceramic proppant that has a porosity of the particulate of 12% will have a higher permeability than an intermediate density ceramic proppant with 12% particulate porosity, which in turn will have a higher permeability than a light weight ceramic proppant with 12% particulate porosity.

According to several exemplary embodiments, a method of hydraulic fracturing operation is provided, the method can injecting a hydraulic fluid into a subterranean formation at a rate and pressure sufficient to open a fracture therein and injecting a proppant composition into the subterranean formation, wherein the proppant composition includes the porous ceramic proppant infused with a chemical treatment agent, as described herein. The chemical treatment agent can separate from the porous ceramic proppant over an extended period of time. The porous ceramic proppant can be or include the infused ceramic proppant via line 128 as disclosed herein.

According to several exemplary embodiments the infused ceramic proppant via line 128 can be combined or mixed with standard non-porous ceramic proppant prior to injection into the subterranean formation. The infused ceramic proppant via line 128 can be mixed with the standard non-porous ceramic proppant in a hydraulic fracture in a way that does not impair the permeability or conductivity of the standard non-porous ceramic proppant alone. For instance, according to several exemplary embodiments of the present invention, if the standard non-porous particulate selected is a light weight ceramic proppant, the porous ceramic particulate can be either an intermediate density ceramic proppant or a high density ceramic proppant. Also, according to several exemplary embodiments of the present invention, if the standard non-porous particulate selected is an intermediate density proppant, the porous ceramic particulate can be a high density ceramic proppant.

For example, the fraction of intermediate density porous ceramic proppant to be added to a standard non-porous light weight ceramic proppant will dictate the maximum porosity that the intermediate density porous ceramic may have and not negatively impact permeability. In this example, if a 10% fraction of intermediate density porous proppant is to be added to a standard light weight ceramic proppant then the maximum porosity of the intermediate density porous proppant may be 12% in order to not reduce the permeability of the proppant as compared to the permeability of the standard light weight ceramic proppant alone whereas adding a 10% fraction of an intermediate density porous proppant having 20% porosity may be detrimental to proppant permeability.

According to several exemplary embodiments of the present invention the infused porous ceramic proppant can have a similar alumina content as the standard non-porous ceramic proppant and can be added to the standard non-porous ceramic proppant in a hydraulic fracture in a way that does not impair the permeability or conductivity of the standard non-porous ceramic proppant alone. According to such embodiments, the porous and non-porous proppants are processed in different ways such that the mechanical properties of the infused porous ceramic proppant is approximately the same as or better that the mechanical properties of the standard non-porous ceramic proppant.

A ceramic proppant composition containing a mixture of infused porous ceramic proppant and non-porous ceramic proppant can have a conductivity that is at least about 10%, at least about 20%, at least about 30%, at least about 40%, at least about 50%, at least about 60%, at least about 70%, at least about 80%, at least about 90%, at least about 95%, or at least about 99% of the conductivity of the non-porous ceramic proppant. For example, the ceramic proppant composition containing a mixture of the infused porous ceramic proppant and non-porous ceramic proppant can have a conductivity from about 25% to about 125%, about 55% to about 115%, about 65% to about 112%, about 75% to about 108%, about 85% to about 105%, about 95% to about 105%, or about 99.99% to about 102% of the conductivity of the non-porous ceramic proppant.

The following examples are included to demonstrate illustrative embodiments of the present invention. It will be appreciated by those of ordinary skill in the art that the techniques disclosed in these examples are merely illustrative and are not limiting. Indeed, those of ordinary skill in the art should, in light of the present disclosure, appreciate that many changes can be made in the specific embodiments that are disclosed, and still obtain a like or similar result without departing from the spirit and scope of the invention.

Example 1

A first sample of porous ceramic proppant having a mesh size of 20/40 and a bulk density of 1.23 g/cc was thermally infused with DTPMP scale inhibitor to provide a first batch of scale inhibitor infused proppant. The first batch was prepared by heating 1,000 lbs of the porous ceramic proppant to a temperature of 450 degrees F. to provide heated proppant and introducing the heated proppant to a mixing tank having a paddle mixing blade. The mixer was started at 45 rpm and a DTPMP solution containing about 55 wt % water and about 45 wt % DTPMP was heated to 120 degrees F. 165 pounds of the heated DTPMP solution was then introduced to the mixer and allowed to mix with the heated proppant for 5 minutes until the water had evaporated from contact with the proppant, resulting in the first batch. The first batch was then cooled to ambient temperature and the proppant of Batch 1 contained 7.0 wt % DTPMP scale inhibitor.

Example 2

A second sample of porous ceramic proppant having a mesh size of 20/40 and a bulk density of 1.23 g/cc was microwave infused with DTPMP scale inhibitor to provide a second batch of scale inhibitor infused proppant. The second batch was prepared by introducing 500 lbs of the porous ceramic proppant at ambient temperature to a mixing tank having a paddle mixing blade. The mixer was started at 45 rpm and a DTPMP solution containing about 55 wt % water and about 45 wt % DTPMP was heated to 120 degrees F. 82.5 pounds of the heated DTPMP solution was then introduced to the mixer and allowed to mix with the porous ceramic proppant. A microwave generator was then turned on and generated 65 kW of microwave energy. Over the course of 15 minutes, the temperature in the mixer increased gradually up to 240 degrees F. at the completion of the run when all water had evaporated, resulting in the second batch. The second batch was then cooled to ambient temperature and the proppant of Batch 2 contained 7.0 wt % DTPMP scale inhibitor.

Example 3

Figure 6A:
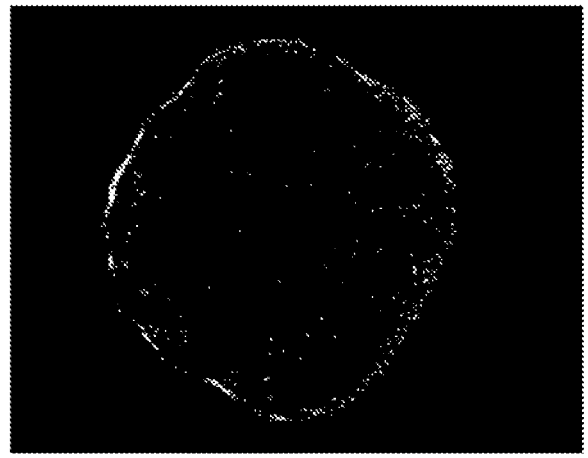
FIG. 6A is a cross-sectional view of Batch 1 obtained from energy dispersive X-ray spectroscopy (EDS), indicating phosphorus distribution and infusion quality.
Figure 6B:
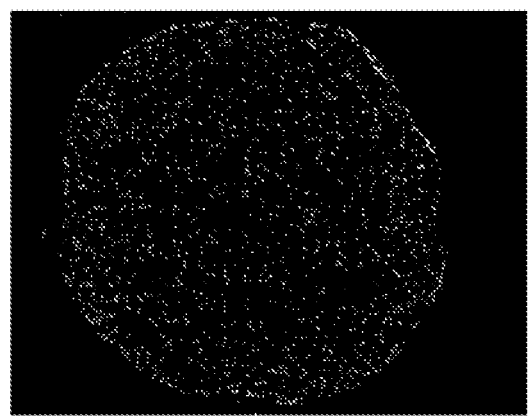
FIG. 6B is a cross-sectional view of Batch 2 obtained from energy dispersive X-ray spectroscopy (EDS), indicating phosphorus distribution and infusion quality.

The infusion quality for each batch was evaluated using energy dispersive X-ray spectroscopy (EDS). Since the scale inhibitor is a phosphonate solution, phosphorus contents were used as an indication of the inhibitor presence. The phosphorus distribution for each pellet using different infusion methods is shown in FIGS. 6A and 6B. A high phosphorus concentration on the shell was observed for both batches. However, the thermal infusion method of Batch 1 (FIG. 6A) failed to carry the inhibitor into the pellet core region while the microwave infusion method used to produce Batch 2 (FIG. 6B) resulted in a substantially uniform distribution of phosphorus, and thus DTPMP, throughout the cross section. These results show that replacing thermal infusion with microwave infusion results in a significant increase in distribution of the scale inhibitor into the porous network of the proppant particle.

Exemplary embodiments of the present disclosure further relate to any one or more of the following paragraphs:

1. A method for infusing ceramic proppant, comprising: introducing ceramic proppant and a chemical treatment agent to a mixing vessel; mixing the ceramic proppant and the chemical treatment agent in the mixing vessel to provide a mixture; introducing microwave energy to the mixing vessel to heat the mixture to a temperature sufficient to produce infused ceramic proppant comprising at least a portion of the chemical treatment agent; and withdrawing the infused ceramic proppant from the mixing vessel.

2. The method according to paragraph 1, wherein the ceramic proppant is a porous ceramic proppant comprising one or more pores and the infused ceramic proppant comprises the chemical treatment agent inside the one or more pores.

3. The method according to paragraph 2, wherein the porous ceramic proppant has a porosity from about 10% to about 75%.

4. The method according to paragraph 3, wherein the porous ceramic proppant has a crush strength at 7,500 psi of from about 1% to about 4.5%, a long term fluid conductivity at 7,500 psi of from about 1,475 mD-ft to about 8,825 mD-ft, and a long term permeability at 7,500 psi of from about 90 D to about 425 D.

5. The method according to any one of paragraphs 1 to 4, wherein the chemical treatment agent is contained in a chemical treatment agent solution when introduced to the mixing vessel.

6. The method according to any one of paragraphs 1 to 5, wherein the chemical treatment agent solution comprises from about 30 wt % to about 60 wt % chemical treatment agent and 40 wt % to about 70 wt % carrier solution.

7. The method according to paragraph 6, wherein the carrier solution is an aqueous solution.

8. The method according to any one of paragraphs 1 to 7, wherein the chemical treatment agent is selected from the group consisting of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, and surfactants and any combination thereof.

9. The method according to paragraph 8, wherein the chemical treatment agent is a scale inhibitor selected from the group consisting of DTPA, DTPMP, polyacrylamides, AMPS/AA, PHOS/MA, and PMA/AMPS and any combination thereof.

10. The method according to any one of paragraphs 1 to 9, wherein the microwave energy heats the mixture to a temperature of at least about 90° C.

11. The method according to any one of paragraphs 1 to 10, wherein the infused ceramic proppant comprises the chemical treatment agent substantially homogeneously distributed throughout the one or more pores.

12. A method for infusing porous ceramic proppant, comprising: introducing porous ceramic proppant and a first chemical treatment agent solution to a mixing vessel; mixing the porous ceramic proppant and the first chemical treatment agent solution in the mixing vessel to provide a primary infusion mixture; introducing microwave energy to the mixing vessel to heat the primary infusion mixture to a temperature sufficient to produce a primary infused ceramic proppant comprising at least a portion of the first chemical treatment agent solution; introducing a second chemical treatment agent solution to the mixing vessel; mixing the primary infused ceramic proppant and the second chemical treatment agent solution in the mixing vessel to provide a secondary infusion mixture; and introducing microwave energy to the mixing vessel to heat the secondary infusion mixture to a temperature sufficient to produce a secondary infused ceramic proppant comprising at least a portion of the first and second chemical treatment agent solutions.

13. The method according to paragraph 12, further comprising: introducing a third chemical treatment agent solution to the mixing vessel; mixing the secondary infused ceramic proppant and the third chemical treatment agent solution in the mixing vessel to provide a tertiary infusion mixture; introducing microwave energy to the mixing vessel to heat the tertiary infusion mixture to a temperature sufficient to produce a tertiary infused ceramic proppant comprising at least a portion of the first, second, and third second chemical treatment agent solutions; and withdrawing the tertiary infused ceramic proppant from the mixing vessel.

14. The method according to paragraphs 12 or 13, wherein the porous ceramic proppant has a porosity from about 10% to about 75%.

15. The method according to paragraph 14, wherein the porous ceramic proppant has a crush strength at 7,500 psi of from about 1% to about 4.5%, a long term fluid conductivity at 7,500 psi of from about 1,475 mD-ft to about 8,825 mD-ft, and a long term permeability at 7,500 psi of from about 90 D to about 425 D.

16. The method according to any one of paragraphs 12 to 15, wherein the first chemical treatment agent solution comprises a first carrier solution comprising one or more hydrocarbons and a first chemical treatment agent selected from the group consisting of paraffin or wax inhibitors, including ethylene vinyl acetate copolymers, asphaltene inhibitors, and organic deposition inhibitors and any combination thereof.

17. The method according to any one of paragraphs 12 to 16, wherein the second chemical treatment agent solution comprises a second chemical treatment agent comprising a scale inhibitor and a second carrier solution comprising water.

18. The method according to paragraph 13, wherein the third chemical treatment agent solution comprises a third chemical treatment agent comprising a salt inhibitor and a third carrier solution comprising water.

19. The method according to any one of paragraphs 12 to 18, wherein the microwave energy heats the secondary infusion mixture to a temperature of at least about 90° C.

20. The method according to paragraph 13, wherein the tertiary infused ceramic proppant comprises the first, second, and third chemical treatment agents substantially homogeneously distributed throughout one or more pores of the porous ceramic proppant.

21. The method according to paragraph 13, wherein the tertiary infused ceramic proppant comprises the first, second, and third chemical treatment agents in a core-shell type distribution throughout the one or more pores of the porous ceramic proppant.

22. An infused porous ceramic proppant particle, comprising: an alumina content of at least about 30 wt %; a porosity of about 24% to about 75%; an apparent specific gravity of less than 2.5 g/cm$^3$; a crush strength at 7500 psi of from about 1% to about 4.5%; a long term fluid conductivity of from about 1,475 mD-ft to about 8,825 mD-ft.; a long term permeability of from about 90 D to about 425 D; and at least about 1 wt % of a first chemical treatment agent, wherein the first chemical treatment agent is substantially homogeneously distributed throughout one or more pores of the porous ceramic proppant particle.

23. The infused porous ceramic proppant particle according to 22, further comprising at least about 1 wt % of a second chemical treatment agent and at least about 1 wt % of a third chemical treatment agent, wherein the first, second, and third chemical treatment agents are each substantially homogeneously distributed throughout the one or more pores of the porous ceramic proppant particle.

24. The infused porous ceramic proppant particle according to paragraphs 22 or 23, wherein the first, second, and third chemical treatment agents are selected from the group consisting of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, and surfactants and any combination thereof.

25. The infused porous ceramic proppant particle according to paragraph 24, wherein the first, second, or third chemical treatment agents are scale inhibitors selected from the group consisting of DTPA, DTPMP, polyacrylamides, AMPS/AA, PHOS/MA, and PMA/AMPS and any combination thereof.

26. A method of fracturing a subterranean formation comprising injecting a hydraulic fluid into the subterranean formation at a rate and pressure sufficient to open a fracture therein, wherein the hydraulic fluid comprises the infused porous ceramic proppant particle according to paragraph 22.

27. A method for infusing ceramic proppant, comprising: introducing ceramic proppant and a chemical treatment agent to a mixing vessel; mixing the ceramic proppant and the chemical treatment agent in the mixing vessel to provide a mixture; introducing thermal energy to the mixing vessel to heat the mixture to a temperature sufficient to produce infused ceramic proppant comprising at least a portion of the chemical treatment agent; and withdrawing the infused ceramic proppant from the mixing vessel.

28. The method according to paragraph 27, wherein the ceramic proppant is porous ceramic proppant comprising one or more pores and the infused ceramic proppant comprises the chemical treatment agent inside the one or more pores.

29. The method according to paragraph 28, wherein the porous ceramic proppant has a porosity from about 10% to about 75%.

30. The method according to paragraph 29, wherein the porous ceramic proppant has a crush strength at 7,500 psi of from about 1% to about 4.5%, a long term fluid conductivity at 7,500 psi of from about 1,475 mD-ft to about 8,825 mD-ft, and a long term permeability at 7,500 psi of from about 90 D to about 425 D.

31. The method according to any one of paragraphs 27 to 30, wherein the chemical treatment agent is contained in a chemical treatment agent solution when introduced to the mixing vessel.

32. The method according to paragraph 31, wherein at least a portion of the chemical treatment agent solution is in the form of a solid when introduced to the mixing vessel.

33. The method according to paragraph 32, wherein the chemical treatment agent solution comprises from about 30 wt % to about 60 wt % chemical treatment agent and 40 wt % to about 70 wt % of a carrier.

34. The according to any one of paragraphs 27 to 33, wherein the chemical treatment agent is selected from the group consisting of tracers, scale inhibitors, hydrate inhibitors, hydrogen sulfide scavenging materials, corrosion inhibitors, paraffin or wax inhibitors, including ethylene vinyl acetate copolymers, asphaltene inhibitors, organic deposition inhibitors, biocides, demulsifiers, defoamers, gel breakers, salt inhibitors, oxygen scavengers, iron sulfide scavengers, iron scavengers, clay stabilizers, enzymes, biological agents, flocculants, naphthenate inhibitors, carboxylate inhibitors, nanoparticle dispersions, and surfactants and any combination thereof.

35. The method according to any one of paragraphs 27 to 34, wherein the chemical treatment agent is a paraffin inhibitor.

36. The method according to any one of paragraphs 27 to 35, wherein the thermal energy heats the mixture to a temperature of at least about 90° C.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account numerical error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

The substantially round and spherical solid ceramic particles that are produced according to the methods described herein are suitable for a variety of uses, including but not limited to use as a proppant in oil or gas wells, and as a foundry media. Other embodiments of the current invention will be apparent to those skilled in the art from a consideration of this specification or practice of the invention disclosed herein. However, the foregoing specification is considered merely exemplary of embodiments of the invention with the true scope and spirit of the invention being indicated by the following claims.

What is claimed is:

1. A method, comprising:
   providing a slurry of ceramic raw material, the slurry comprising a polysaccharide, a dispersant, and a pH-adjusting agent, wherein the slurry has a solids content from about 25 wt % to about 75 wt %; wherein the slurry has a viscosity of less than 150 cP and a pH of about 9 to about 10.5;
   flowing the slurry through a nozzle while vibrating the slurry to form droplets in a surrounding gas to form droplets having a substantially spherical shape, wherein the slurry of ceramic raw material flows through the nozzle at a rate of about 1 to about 15 kg/(mm²×hr);
   gelling the droplets upon contact with a liquid to provide gelled droplets, wherein the liquid comprises a coagulation agent;
   transferring the gelled droplets from the liquid;
   drying the gelled droplets to form green pellets;
   sintering the green pellets in a selected temperature range to form sintered pellets;
   introducing the sintered pellets to a mixing vessel, the mixing vessel comprising a chemical treatment agent solution; and
   introducing microwave energy to the mixing vessel comprising the sintered pellets and the chemical treatment agent solution.

2. The method of claim 1, wherein the polysaccharide is an alginate.

3. The method of claim 1, wherein the coagulation agent is calcium chloride.

4. The method of claim 1, wherein the reactant and the coagulation agent react to form a semi-solid surface on the droplets.

5. The method of claim 1, wherein the slurry is vibrated as it flows from the nozzle by vibrating the nozzle.

6. The method of claim 1, wherein the ceramic raw material is selected from the group consisting of bauxite, kaolin, alumina, and mixtures thereof.

7. The method of claim 1, wherein the gas is air.

8. The method of claim 1, wherein the sintered pellets have an average largest pore size of less than about 20 microns.

9. The method of claim 1, wherein the sintered pellets have an average roughness of less than about 2 microns.

10. The method of claim 1, wherein the sintered pellets are formed without subjecting the droplets to a sol-gel reaction.

11. The method of claim 1, wherein the green pellets are sintered at a temperature in the range from about 1400° C. to about 1650° C.

12. The method of claim 1, wherein sintering the green pellets comprises introducing the green pellets to a gas-fired rotary kiln.

13. The method of claim 1, wherein sintering the green pellets comprises introducing the green pellets to a microwave furnace.

14. The method of claim 1, wherein the dispersant comprises about 0.05% to about 0.45% by weight of the slurry based on the dry weight of the ceramic raw material.

15. The method of claim 1, wherein the dispersant is selected from the group consisting of sodium polyacrylate, ammonium polyacrylate, ammonium polymethacrylate, tetra sodium pyrophosphate, tetra potassium pyrophosphate, polyphosphate, ammonium polyphosphate, ammonium citrate, ferric ammonium citrate, ammonium polymethacrylate, and combinations thereof.

16. The method of claim 1, wherein the pH-adjusting agent is selected from the group consisting of ammonia, sodium carbonate, and combinations thereof.

17. The method of claim 1, wherein the chemical treatment agent solution comprises a chemical treatment agent and a carrier.

18. The method of claim 17, wherein the chemical treatment agent solution comprises about 5 wt % to about 65 wt % of the chemical treatment agent.

19. The method of claim 17, wherein the chemical treatment agent solution comprises about 35 wt % to about 85 wt % carrier.

20. The method of claim 1, wherein the microwave energy is provided by a first microwave generator and a second microwave generator.

* * * * *